US012096886B2

(12) United States Patent
Souris et al.

(10) Patent No.: US 12,096,886 B2
(45) Date of Patent: Sep. 24, 2024

(54) PORTABLE HEATING DEVICE

(71) Applicant: Warmer Products, LLC, Dover, DE (US)

(72) Inventors: Anthony M. Souris, Phoenix, AZ (US); Shane P. Rogers, Los Gatos, CA (US)

(73) Assignee: Warmer Products, LLC, Dover, DE (US)

( * ) Notice: Subject to any disclaimer, the term of this patent is extended or adjusted under 35 U.S.C. 154(b) by 904 days.

(21) Appl. No.: 17/168,758

(22) Filed: Feb. 5, 2021

(65) Prior Publication Data

US 2021/0235931 A1   Aug. 5, 2021

Related U.S. Application Data

(60) Provisional application No. 62/970,277, filed on Feb. 5, 2020.

(51) Int. Cl.
*A47J 41/00* (2006.01)
*G06F 3/041* (2006.01)
(Continued)

(52) U.S. Cl.
CPC ......... *A47J 41/005* (2013.01); *A47J 41/0005* (2013.01); *A47J 41/0094* (2013.01);
(Continued)

(58) Field of Classification Search
CPC .. A47J 41/005; A47J 41/0005; A47J 41/0094; A47J 2202/00; G06F 3/041; G08B 5/223; G08B 5/36; H05B 1/0252
(Continued)

(56) References Cited

U.S. PATENT DOCUMENTS 4,560,915 A * 12/1985 Soultanian ............ H02J 7/0049
320/133
5,454,427 A * 10/1995 Westbrooks, Jr. ...... A23L 3/365
99/332
(Continued)

FOREIGN PATENT DOCUMENTS

CA      2943107 A1 *  3/2018 ............ A47J 43/046
CN    109478793 A  *  3/2019 ............. H02J 50/12
(Continued)

*Primary Examiner* — Eric S Stapleton
(74) *Attorney, Agent, or Firm* — Law Offices of Damon L. Boyd, PLLC

(57) ABSTRACT

An example portable heating device includes a container, one or more heating elements, an electronic device, one or more temperature sensors, a controller, a power supply, and a power supply controller. The one or more heating elements are in thermal contact with the container. The electronic device is configured to receive a user input selecting a target temperature to heat a substance in the container to and to display the target temperature. The controller is configured to cause the one or more heating elements to heat the substance to the target temperature in response to determining the current temperature of the substance measured by the one or more temperature sensors is less than the target temperature. The power supply is configured to provide power to the one or more heating elements, the electronic device, the one or more temperature sensors, and the controller.

18 Claims, 12 Drawing Sheets

(51) Int. Cl.
  *G08B 5/22* (2006.01)
  *G08B 5/36* (2006.01)
  *H05B 1/02* (2006.01)

(52) U.S. Cl.
  CPC ......... *H05B 1/0252* (2013.01); *A47J 2202/00* (2013.01); *G06F 3/041* (2013.01); *G08B 5/223* (2013.01); *G08B 5/36* (2013.01)

(58) Field of Classification Search
  USPC ........................................................ 219/387
  See application file for complete search history.

(56) References Cited

U.S. PATENT DOCUMENTS

| | | | | |
|---|---|---|---|---|
| 5,771,959 | A * | 6/1998 | Westbrooks, Jr. | A23L 3/365 |
| | | | | 219/386 |
| 5,797,445 | A * | 8/1998 | Westbrooks, Jr. | F25D 23/12 |
| | | | | 219/386 |
| 7,554,434 | B1 * | 6/2009 | Gifford | A61J 7/0436 |
| | | | | 215/230 |
| 9,252,631 | B2 * | 2/2016 | Latham | H02J 1/102 |
| 9,444,087 | B1 * | 9/2016 | Jeon | H01M 50/107 |
| 9,801,482 | B1 * | 10/2017 | Alexander | A47G 19/2288 |
| 10,010,213 | B2 * | 7/2018 | Alexander | A47J 41/0044 |
| 10,182,674 | B2 * | 1/2019 | Alexander | A47J 41/0044 |
| 10,963,089 | B2 * | 3/2021 | Murakami | G06F 3/041 |
| 2003/0161922 | A1 * | 8/2003 | Hillmann | F24C 7/082 |
| | | | | 426/523 |
| 2006/0287007 | A1 * | 12/2006 | Veselic | H04B 1/1607 |
| | | | | 455/572 |
| 2009/0152258 | A1 * | 6/2009 | Schandel | A47J 27/004 |
| | | | | 219/439 |
| 2009/0276637 | A1 * | 11/2009 | Coonan | H02J 7/0045 |
| | | | | 713/300 |
| 2012/0205475 | A1 * | 8/2012 | Wu | A47J 43/046 |
| | | | | 366/205 |
| 2012/0293332 | A1 * | 11/2012 | Rosenfeld | H04Q 9/00 |
| | | | | 206/459.1 |
| 2012/0313437 | A1 * | 12/2012 | Latham | H02J 7/0063 |
| | | | | 307/65 |
| 2013/0200841 | A1 * | 8/2013 | Farkas | H02J 7/00 |
| | | | | 320/107 |
| 2014/0081521 | A1 * | 3/2014 | Frojdh | G06F 3/04883 |
| | | | | 701/36 |
| 2014/0332433 | A1 * | 11/2014 | Lyall, III | A47J 41/0094 |
| | | | | 206/459.1 |
| 2015/0245723 | A1 * | 9/2015 | Alexander | A47J 39/025 |
| | | | | 219/387 |
| 2016/0218884 | A1 * | 7/2016 | Ebrom | H04L 12/2816 |
| 2016/0327302 | A1 * | 11/2016 | Ribbich | H05B 47/11 |
| 2017/0026069 | A1 * | 1/2017 | Kim | H04M 1/0254 |
| 2017/0042373 | A1 * | 2/2017 | Alexander | A47J 31/4417 |
| 2017/0090714 | A1 * | 3/2017 | Lee | G06F 3/041 |
| 2018/0310758 | A1 * | 11/2018 | Gabbay | A47J 36/321 |
| 2018/0317692 | A1 * | 11/2018 | Huang | F24C 15/002 |
| 2019/0099027 | A1 * | 4/2019 | Jackson | A47J 41/0072 |
| 2019/0223639 | A1 * | 7/2019 | Alexander | A47J 41/0044 |
| 2019/0254476 | A1 * | 8/2019 | Anthony | A47J 37/0664 |

FOREIGN PATENT DOCUMENTS

| | | | | |
|---|---|---|---|---|
| GB | | 2483308 A * | 3/2012 | ............ G06F 1/1632 |
| WO | WO-2014138990 A1 * | | 9/2014 | ......... A61N 1/36014 |

* cited by examiner

PORTABLE HEATING DEVICE

CROSS-REFERENCE TO RELATED APPLICATION

This application claims the benefit of and priority to U.S. Provisional Patent Application Ser. No. 62/970,277, filed on Feb. 5, 2020, titled "PORTABLE CONTAINER USED TO HEAT LIQUID AND FOOD", the disclosure of which is incorporated herein by reference in its entirety.

FIELD

The embodiments discussed in the present disclosure are related to a portable heating device.

BACKGROUND

Unless otherwise indicated herein, the materials described herein are not prior art to the claims in the present application and are not admitted to be prior art by inclusion in this section.

Various foods and/or drinks may be more enjoyable when served warm or hot. Some situations may arise where conventional heating methods, such as stove top, microwave, and other similar mechanisms, may not be available to heat the foods and/or drinks.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

In an embodiment, a portable heating device includes a container, a lid, a lid sensor, a heating element, an electronic device, a temperature sensor, an insulation layer, a power source, and a controller. The container is disposed within a housing. The lid is disposed on an upper portion of the housing and is arranged to cover and seal an interior portion of the container. The lid sensor is disposed in the housing. The heating element is in thermal contact with the container. The electronic device is coupled to the housing. The electronic device is configured to receive input that includes a target temperature to heat a substance in the container to. The temperature sensor is in thermal contact with the container. The insulation layer is coupled to the container and arranged to thermally isolate the heating element from at least the electronic device and the controller. The power source is operably connected to the lid sensor, the heating element, the electronic device, the temperature sensor, and the controller. The controller is operably connected to the heating element, the electronic device, the lid sensor, and the temperature sensor. The controller is configured to determine a lid status based on a lid signal from the lid sensor. The controller is also configured to determine a current temperature of the substance based on a temperature signal from the temperature sensor. The controller is also configured to cause the heating element to heat the substance to the target temperature in response to the current temperature being less than the target temperature.

In another embodiment, a portable heating device includes a container, one or more heating elements, an electronic device, one or more temperature sensors, a controller, a power supply, and a power supply controller. The container is internally and centrally disposed within a housing. The one or more heating elements are in thermal contact with the container. The electronic device is disposed on an exterior portion of the housing. The electronic device is configured to receive a user input selecting a target temperature to heat a substance in the container to and to display the target temperature. The one or more temperature sensors are disposed in thermal contact with the container. The controller is operably connected to the one or more heating elements, the electronic device, and the one or more temperature sensors. The controller is configured to cause the one or more heating elements to heat the substance to the target temperature in response to determining the current temperature of the substance measured by the one or more temperature sensors is less than the target temperature. The power supply is disposed within a lower end of the housing. The power supply is configured to provide power to the one or more heating elements, the electronic device, the one or more temperature sensors, and the controller. The power supply controller is operably connected to the power supply and is configured to regulate the power supply.

In another embodiment, a method to portably heat a substance includes receiving a substance in a container in thermal contact with a heating element and a temperature sensor. The method also includes receiving user input to power on a device, to select a target temperature, and to begin a heating cycle. The method further includes heating the substance within the container by the heating element. The method also includes detecting a current temperature of the substance by the temperature sensor. The method further includes turning off the heating element and providing a notification that the heating cycle is complete when the current temperature is equal to the target temperature.

These and other aspects, features and advantages may become more fully apparent from the following brief description of the drawings, the drawings, the detailed description, and appended claims.

BRIEF DESCRIPTION OF THE DRAWINGS

Example embodiments will be described and explained with additional specificity and detail through the use of the accompanying drawings in which.

DESCRIPTION OF EMBODIMENTS

Figure 1A:
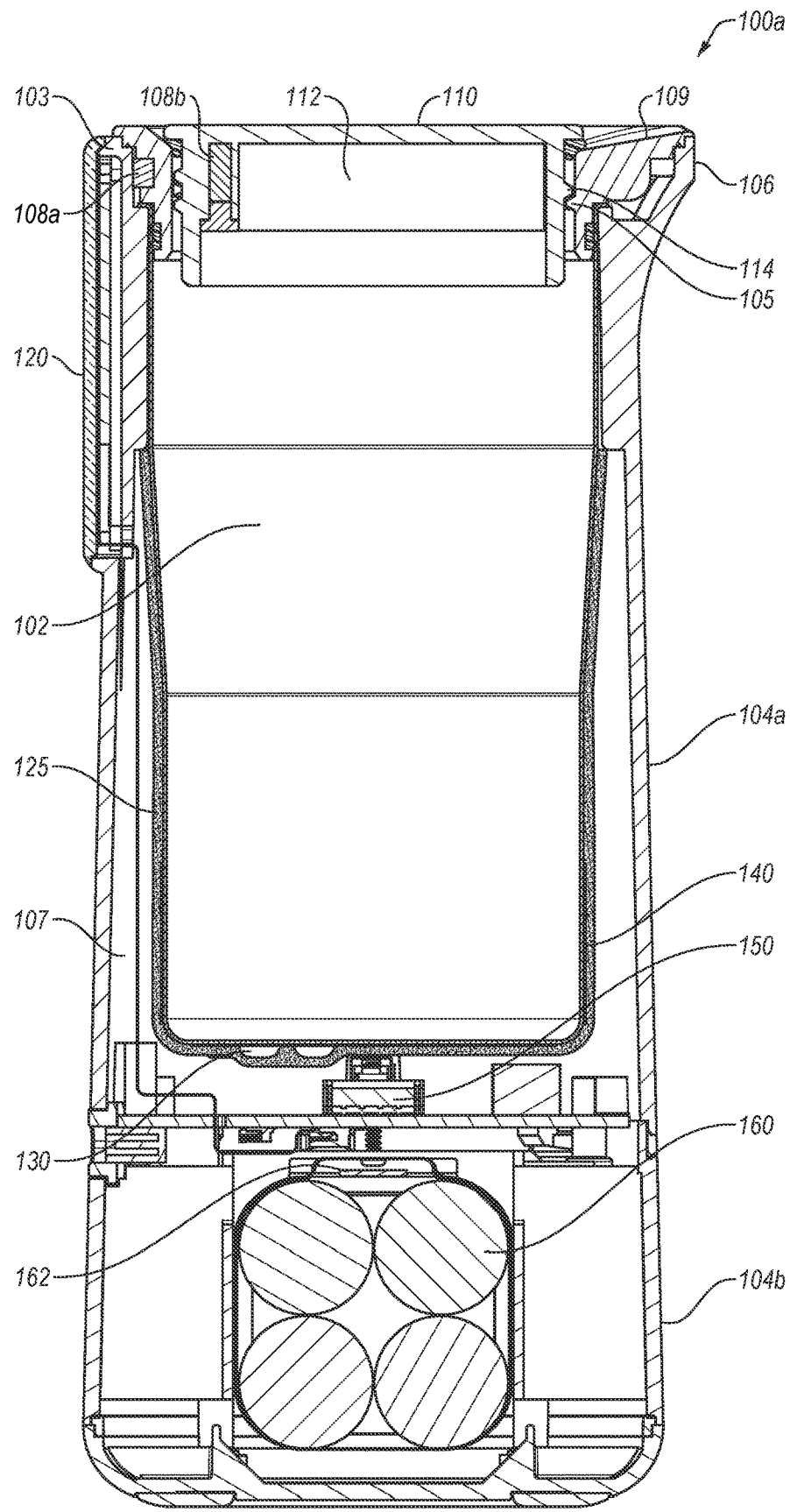
FIG. 1A is a cross-sectional view of an example portable heating device.

People enjoy various foods and liquids served hot including soups, coffee, tea, and hot chocolate. Children and babies also enjoy or prefer certain foods and liquids warmed such as fruit and vegetable purees, milk, formula, and/or breast milk. Some methods of having warmed food and/or liquid on-the-go include preparing it with a fixed power source and storing it until a later time. In some circumstances, the delay between preparation and consumption may be substantial and the warmed food or liquid may no longer be heated.

Some heating devices include portable operations, but are often limited by slow heating cycles, only a single heating cycle per battery charge, and/or limited control over a fine temperature adjustment.

Dependence on a fixed power source for heating food and/or liquid may restrict times and locations where heating may occur, may confine users within proximity of the fixed power source, and/or may require overheating the food and/or liquid such that it stays warmer for longer. In the first instance, some foods and/or liquids have to be discarded if heated in advance but not consumed within a certain amount of time after heating (e.g., an hour), such as baby formula and/or breast milk. In the second instance, a person is not able to be away from a fixed power source for long periods of time. In the third instance, overheating may damage the food and/or liquid as the extreme heat may cause nutrients to be damaged or lost, and/or the extreme temperature may render the food and/or liquid hazardous to consume if it is consumed shortly after preparation. It may be desirable to be away from a fixed power supply while still being able to warm food and/or liquid. For example, in instances of travelling long periods of time, such as in a car, a baby may become hungry and desire warmed formula and/or breast milk regardless of proximity of a fixed power source. In circumstances where a user is removed from a fixed power source for a long period of time, more than one heating cycle may be desired. In some circumstances, heating food and/or liquid to a specific temperature may be desirable such that is it warm enough to enjoy but not too hot to cause harm. In some circumstances, food and/or liquid that is frozen may be defrosted and afterwards warmed such that it may be consumable, such as frozen breast milk for a baby.

In some embodiments of the present disclosure, a portable heating device may include a container that is capable of heating foods and liquids, in a form factor that is easy to transport, manipulate, and clean. Additionally, the portable heating device may be capable of quickly heating the contents within and may be capable of performing multiple heating cycles between recharges.

In some circumstances, embodiments of the present disclosure may facilitate warming of foods and/or liquids in a portable heating device. In addition, the portable heating device may include enough stored power to perform multiple heating cycles prior to recharging. In some circumstances, the portable heating device may provide temperature control such that the device may be configured to heat food and/or liquid to a specific temperature, with accuracy to a single degree Fahrenheit. In some circumstances, the portable heating device may provide a user with a notification of a completed cycle and an indication of when a last cycle was completed. For example, the portable heating device may push a notification to a user's phone upon completing a heating cycle and may notify the user of the last time a heating cycle was completed. In some circumstances, the portable heating device may include sensors and provide notifications to the user that promote safe use of the device. For example, the portable heating device may detect the lid is still attached and may provide a notification indicating such, as an attached lid to the portable heating device during a heating cycle may be hazardous.

These and other embodiments of the present disclosure will be explained with reference to the accompanying figures. It is to be understood that the figures are diagrammatic and schematic representations of such example embodiments, and are not limiting, nor are they necessarily drawn to scale. In the figures, features with like numbers indicate like structure and function unless described otherwise.

FIG. 1A is a cross-sectional view of an example portable heating device 100a, in accordance with at least one embodiment described in the present disclosure. The portable heating device 100a may include a container 102, an upper housing 104a, a lower housing 104b (the upper and lower housings 104a, 104b are hereinafter collectively referred to as housing 104), a lid 110, an electronic device 120, a heat insulation layer 125, a temperature sensor 130, a heating element 140, a controller 150, a power supply 160, and a power supply controller 162. The housing 104 may include a superior edge 103, the upper housing 104a, the lower housing 104b, inner threads 105, a spout 106, a cavity 107, a first lid sensor 108a, and a spout overlay 109. The lid 110 may include a second lid sensor 108b, a lid cavity 112, and outer threads 114.

In some embodiments, the container 102 may be substantially cylindrical in shape. For example, the container 102 may include a circular top that is open, which may enable foods and liquids to enter and exit an interior of the container 102, and a circular bottom that is closed. The top and bottom may be joined by one or more sidewalls, such as a cylindrical sidewall when the top and bottom are circles of equal radius, or a frustoconical sidewall when the top and bottom are circles of unequal radius. In some embodiments, the one or more sidewalls of the container 102 may be substantially vertical when the container 102 is placed bottom down on a flat surface. Alternatively or additionally, the top, bottom, and/or sidewalls may have other shapes. For example, the top and/or bottom may have a polygonal shape, a rounded polygonal shape, an oval shape, an elliptical shape, or other well-defined or arbitrary shape. The one or more sidewalls that join the top and bottom may be conical, frustoconical, pyramidal, frustopyramidal, or other well-defined or arbitrary shape. The top and bottom may have the same shape and size, the same shape and different sizes, or different shapes and sizes.

In an example, as already indicated, the one or more sidewalls may be a frustoconical sidewall. For example, the bottom of the container 102 may be circular with a first radius and the top of the container 102 may be circular with a second radius, where the second radius is larger than the first radius.

Alternatively or additionally, the walls of the container 102 may include combinations of a substantially cylindrical sidewall and a frustoconical sidewall or combinations of other shaped sidewalls. For example, a lower portion of the container 102 that includes the bottom may be cylindrical with a radius that is comfortable to hold in a hand, and an upper portion of the container 102 that includes the top may be frustoconical, which may permit more foods and/or liquids to be held within the container 102 while still being comfortably held in a hand.

In some embodiments, the container 102 may be between approximately 4 inches and approximately 10 inches tall. In some embodiments, the opening in the top of the container 102 may be between approximately 2 inches and approximately 3 inches in diameter. In some embodiments, a volume of the container 102 may be between approximately 0.1 liters and approximately 1 liter.

In some embodiments, the container 102 may include volume markings on the interior of the container 102 such as ¼ cup, ⅓ cup, ⅔ cup, ¾ cup, 1 cup, 2 cups, 10 milliliters (mL), 100 mL, 200 mL, 400 mL, or less or greater volume than the foregoing. In some embodiments, the volume markings on the interior of the container 102 may enable the container 102 to be used as a measuring cup or device.

In some embodiments, the container 102 may include metal and/or other materials that may be capable of conductive heat transfer and may be resistant to chemical reactions with the food and/or liquid contained therein. For example, the container 102 may include food grade metals and/or other materials such that the metals and/or materials, including the surfaces thereof, are safe for contact with food and/or liquid intended for human consumption. In some embodiments, the container 102 may include aluminum, copper, stainless steel (e.g., any of various iron-based alloys), and/or other metals. Alternatively or additionally, the container 102 may include any of various combinations of metals, such as aluminum alloys. In some embodiments, a thickness of the walls of the container 102 (e.g., the bottom and sidewall) may be thin, which may improve heat transfer and may increase useable volume within the container 102. For example, in some embodiments, the thickness of the walls of the container 102 may be between approximately 0.5 millimeters and approximately 1 millimeter.

In general, the container 102 may be disposed within the housing 104 at least during operation. The container 102 may be removable from the housing 104 or fixed. In some embodiments, the upper housing 104a may define the cavity 107 with a shape that is complementary to the shape of the container 102. Alternatively or additionally, the cavity 107 of the upper housing 104a may be larger than the container 102 such that it may provide a gap between an interior surface of the cavity 107 of the upper housing 104a and an exterior surface of the container 102.

In some embodiments, the housing 104 may provide a layer of insulation between the exterior surface of the container 102 and an exterior surface of the housing 104. The exterior surface of the housing 104 may serve as a contact surface with the user when the portable heating device 100a is handled. The layer of insulation may protect the user against burns from the container 102 and/or the heating element 140. For example, the housing 104 may include one or more thermally insulative materials, such as silicone, plastic, ceramic, and/or other materials that are resistant to heat transfer, which may insulate the exterior surface of the housing 104 against heat transfer from the container 102 and/or the heating element 140. Alternatively or additionally, the gap between the interior surface of the cavity 107 of the housing 104 and the exterior surface of the container 102 may include a vacuum seal and/or air which may further reduce or inhibit heat transfer from the container 102 and/or the heating element 140 to the exterior surface of the housing 104. In some embodiments, the portable heating device 100a may further include an exterior sleeve (not shown) configured to slide over an exterior portion of the housing 104 and which may add an additional layer of insulation between the user and the portable heating device 100a. The exterior sleeve may include materials such as silicone, plastic, or other similar pliable, heat resistant materials.

In some embodiments, the spout 106 may be located on an upper portion of the upper housing 104a. The spout 106 may include a protrusion on an exterior portion of the upper end of the upper housing 104a. For example, the exterior portion of the upper end of the upper housing 104a may be substantially round or circular with the exception of the spout 106 portion, which spout 106 may extend outwards from the upper portion of the upper housing 104a. In some embodiments, the spout 106 may include a groove on a top surface thereof, which may facilitate easier pouring of food and/or liquid from the container 102 to an external container.

In some embodiments, the shape of the spout 106 may be formed by the material and/or materials of the housing 104. For example, the upper end of the upper housing 104a may include a formation that defines the shape of the spout 106. Alternatively or additionally, a spout overlay 109 may be configured to couple to the upper end of the upper housing 104a, which may form some or all of the spout 106. In some embodiments, the spout overlay 109 may be configured to extend into the interior of the upper housing 104a, which may be configured to secure the container 102 into a fixed position. For example, in instances in which the container 102 is disposed within the upper housing 104a, the spout overlay 109 may include an extension that secures the container 102 in place within the upper housing 104a when the spout overlay 109 is coupled to the upper housing 104a. In some embodiments, the spout overlay 109 may be bonded to the container 102 and/or the upper housing 104a. In instances in which the spout overlay 109 is bonded to the container 102 and/or the upper housing 104a, the spout overlay 109 may secure the container 102 within the housing 104.

In some embodiments, an interior surface of the spout overlay 109 may include the inner threads 105. The inner threads 105 may include a helical ridge that may be sized and configured to receive or mate with a complementary second helical ridge of another object, such as of the lid 110. Alternatively or additionally, the inner threads 105 may be disposed on an interior surface of the upper portion of the upper housing 104a.

In some embodiments, the lid 110 may be sized and configured to cover and seal the open, upper portion of the upper housing 104a and the open, circular top of the container 102. For example, when installed, the lid 110 may hermetically seal the opening in the upper housing 104a and the container 102. In some embodiments, the lid 110 may include the outer threads 114 which may be helical and complementary to the inner threads 105. For example, the outer threads 114 of the lid 110 may be screwed into the inner threads 105 of the spout overlay 109. In some embodiments, the outer threads 114 of the lid 110 may be screwed into the inner threads 105 of the spout overlay 109 until a portion of the lid 110 contacts the superior edge 103 of the upper portion of the upper housing 104a.

In some embodiments, the first lid sensor 108a may be disposed within or on the upper housing 104a and the second lid sensor 108b may be disposed within or on the structure of the lid 110. The first lid sensor 108a may include a Hall sensor and the second lid sensor 108b may include magnets configured to be detected by the Hall sensor. For example, a Hall sensor may be disposed within the upper housing 104a and one or more magnets may be disposed within the lid 110 such that the Hall sensor detects the magnets in instances when the lid 110 is screwed in until the lid 110 comes into contact with the superior edge of the upper housing 104a.

Alternatively or additionally, the first lid sensor 108a and the second lid sensor 108b may be embedded in the inner threads 105 and the outer threads 114 and may be configured to detect when the lid 110 has sufficiently screwed into the upper housing 104a. For example, one or both of the inner threads 105 and the outer threads 114 may include one or more proximity sensors that may be configured to provide a notification that indicates whether the lid 110 is sufficiently screwed into the upper housing 104a.

Alternatively or additionally, the superior edge 103 of the upper housing 104a may include or have disposed thereon the first lid sensor 108a which may be configured to detect when the lid 110 is in contact with the upper housing 104a. For example, the first lid sensor 108a may be embedded in the superior edge 103 of the upper housing 104a that may detect when the lid 110 is sufficiently screwed into the upper housing 104a. Further, the first lid sensor 108a may be configured to detect instances where the lid 110 is partially screwed into the upper housing 104a, but not enough so as to close and seal the interior portion of the upper housing 104a and the container 102.

In these and other embodiments, the first lid sensor 108a and the second lid sensor 108b may be configured to detect when the lid 110 is attached to the housing 104 and/or the container 102. In instances in which the lid 110 is attached to the housing 104 and/or the container 102 and a heating cycle is requested, a notification may be presented (as described below) to the user that the lid 110 is attached and the heating cycle may not start until the lid 110 is removed.

In some embodiments, the portable heating device 100a may include a mechanical pressure release valve configured to release excess pressure that may build up in the container 102. For example, in instances in which the lid 110 is attached to the housing 104 and a heating cycle is in progress, the mechanical pressure release valve may release excess pressure in the container 102 which may reduce risk of over pressurization and/or damage to the user and/or the portable heating device 100. In some embodiments, the mechanical pressure release valve may be disposed on the lid 110. Alternatively or additionally, the mechanical pressure release valve may be disposed on the housing 104, such that the mechanical pressure release valve may maintain fluid communication with the interior of the container 102. The mechanical pressure release valve may be included as part of the portable heating device 100a instead of or in addition to the first and/or second lid sensors 108a, 108b.

In some embodiments, the lid cavity 112 may include a cylindrical cavity formed within the lid 110, where the opening to the lid cavity 112 may be adjacent to the top of the container 102. In some embodiments, the lid cavity 112 may be in fluid communication with the interior of the container 102.

The lid cavity 112 may have a volume such as ¼ cup, ⅓ cup, ⅔ cup, ¾ cup, 1 cup, 10 milliliters (mL), 100 mL, 200 mL, 400 mL or less or greater volume than the foregoing. In some embodiments, the lid 110 may include volume markings on the interior of the lid cavity 112 to use the lid 110 as a measuring cup.

In some embodiments, the electronic device 120 may be coupled to the exterior surface of the housing 104. In some embodiments, the electronic device 120 may be coupled to the upper housing 104a. Alternatively or additionally, the electronic device 120 may be coupled to the lower housing 104b. In these and other embodiments, the housing 104 may include a cavity configured to receive the electronic device 120. For example, in instances in which the electronic device is rectangular, a sidewall of the housing 104 may include a rectangular cavity sized to receive the electronic device 120.

In some embodiments, the electronic device 120 may include a touchscreen that may receive user input and/or display information related to the portable heating device 100a. For example, the electronic device 120 may receive user input effective to power up or power down the portable heating device 100a, select an operational mode, alter a target temperature, set a heating cycle timer, configure the portable heating device 100a settings including setting a current time, and/or other similar actions. Alternatively or additionally, the electronic device 120 may display information related to the portable heating device 100a or its contents, such as a current temperature of or in the container 102, the target temperature, warnings and/or notifications to the user, current battery level, current time, time remaining on current heating cycle timer, time of last heating cycle, and/or other similar displays. For example, a user may provide an input to change the temperature display from degrees Fahrenheit to degrees Celsius and the display may update to show target temperatures and current temperatures in degrees Celsius.

In some embodiments, the electronic device 120 may accept user input to select an operational mode. The operational modes may include baby liquid mode, adult liquid mode, soft foods mode, sterilization mode, and/or other mode. In some embodiments, the soft foods mode may include user input to the electronic device 120 setting a target temperature and setting a heating cycle timer. In some embodiments, sterilization mode may include boiling water to sterilize accessories, such as baby bottles and attachments, and/or sterilizing the interior of the portable heating device 100a.

In some embodiments, the electronic device 120 may permit target temperatures to be modified in increments as small as one-degree Fahrenheit or even fractions of a degree Fahrenheit. Alternatively or additionally, modifying the target temperature may be done in larger segments, such as in instances where the user is changing the target temperature by a large amount of degrees. For example, a user changing the target temperature from 100 degrees Fahrenheit to 150 degrees Fahrenheit may continuously hold down an increment button on the electronic device 120 which may alter the target temperature by five-degree increments once every second or other period as the button remains held down, as opposed to a default one-degree increment each time the button is depressed and released without being held down continuously. Alternatively or additionally, the target temperature may have a default setting and/or may include incremental changes that may depend on the food and/or liquid within the container 102. For example, when the operational mode is set to baby liquid mode, the target temperature may default to 95 degrees Fahrenheit; when the operational mode is set to adult liquid mode, the target temperature may default to 150 degrees Fahrenheit. In some embodiments, the portable heating device 100a may include a sterilization mode in which the target temperature defaults to about a boiling point of water or other boiling point, such as about 212 degrees Fahrenheit. Alternatively or additionally, combinations of the temperature settings may be combined to achieve a specific desired temperature. For example, when the operational mode is set to adult liquid mode, the target temperature may default to 150 degrees Fahrenheit but may be adjusted up or down (e.g., to 154 or 146 degrees Fahrenheit) in one-degree or other increments, as desired (see FIGS. 5A-5F for additional details related to the electronic device 120).

In some embodiments, the electronic device 120 may include safety limitations on selectable temperatures by the user. For example, in instances where the portable heating device 100a is being used to warm a drink for a child (e.g., when operating in the baby liquid mode or a child liquid mode), the limitation on maximum temperature may be set such that the temperature of the drink does not exceed 95 degrees Fahrenheit. In instances where a drink is prepared for an adult, a higher maximum temperature may be employed. In these and other embodiments, the maximum temperature may be selectable and alterable within a settings page of the electronic device 120.

In some embodiments, the touchscreen of the electronic device 120 may include capacitive, resistive, infrared grid, optical imaging, and/or other technologies. Alternatively or additionally, the electronic device 120 may include depressible buttons that may be configured to receive user input.

In some embodiments, the temperature sensor 130 may be coupled to the exterior portion of the container 102. For example, an adhesive strip may couple the temperature sensor 130 to the sidewall of the container 102. Alternatively or additionally, the temperature sensor 130 may be disposed within the housing 104 and located near enough to the container 102 such that the temperature sensor 130 may still be thermally coupled to the container 102 and may be configured to determine a temperature of food and/or liquid within the container 102.

In some embodiments, multiple temperature sensors 130 may be coupled to the exterior of the container 102 which may enable the temperature sensors 130 to determine the temperature throughout the interior of the container 102. For example, temperature sensors 130 may be vertically spaced across the exterior of the container 102 which may enable the temperature sensors 130 to detect the temperature of the food and/or liquid throughout the interior of the container 102. Detecting the temperature of the food and/or liquid throughout the interior of the container 102 may reduce the likelihood of occurrence of overheated pockets of food and/or liquid. Alternatively or additionally, the multiple temperature sensors 130 may help safeguard the food and/or liquid in the interior of the container 102 from overheating which may damage or diminish the quality of the food and/or liquid. For example, measurements from multiple temperature sensors 130 sensing the temperature at different locations throughout the container 102 can be used to ensure no part of any breast milk within the container 102 is heated in excess of 105° F. above which temperature nutrient content of the breast milk may be damaged or destroyed.

In some embodiments, the multiple temperature sensors 130 may be linearly and/or equally spaced along the exterior of the container 102. Alternatively or additionally, the multiple temperature sensors 130 may be distributed around the container 102 to determine the temperature of the food and/or liquid in the interior of the container 102. In these and other embodiments, the multiple temperature sensors 130 may be coupled to the container 102 with an adhesive, such as one or more adhesive strips.

In some embodiments, the temperature sensors 130 may be configured to detect the volume of the food and/or liquid contained within the container 102. For example, in instances in which the container 102 is substantially cylindrical, the temperature sensors 130 may be vertically and evenly spaced such that each temperature sensor of the temperature sensors 130 is capable of detecting a temperature of or proximate to an ounce or other predetermined volume of food and/or liquid within the container 102. In some embodiments, the temperature sensors 130 adjacent to food and/or liquid within the container 102 may detect a different temperature than the temperature sensors 130 not adjacent to the food and/or liquid, which may indicate the volume of food and/or liquid within the container 102. In instances in which the container 102 is not substantially cylindrical, the spacing between the vertical temperature sensors 130 may be adjusted such that one temperature sensor of the temperature sensors 130 may still measure one ounce or other predetermined volume within the container 102.

In these and other embodiments, the temperature sensor 130 may be disposed in thermal contact with the container 102, such that heat may be conductively transferred between the temperature sensor 130 and the container 102. Further, although in some instances the temperature sensor is discussed as a single temperature sensor 130, the temperature sensor 130 may include two or more temperature sensors 130, which may be disposed at various locations throughout the housing 104 and the container 102. For example, one or more temperature sensors 130 may be coupled to the exterior surface of the container 102, one or more temperature sensors 130 may be coupled to the heating element 140, and one or more temperature sensors 130 may be coupled to the power supply 160, where some temperature sensors 130 may be used to detect the temperature of the solid and/or liquid within the container 102 and some temperature sensors 130 may be used as a diagnostic to ensure the heating element 140 and the power supply 160 are operating within a safe temperature range.

In some embodiments, the heating element 140 may be coupled to the exterior portion of the container 102. For example, the heating element 140 may be coupled to the sidewall of the container 102 with an adhesive and/or an adhesive strip, analogous to the coupling of the temperature sensor 130. Alternatively or additionally, the heating element 140 may be coupled to the bottom of the container 102. For example, a heating element 140 may be coupled to the bottom of the container 102 and a heating element 140 may be coupled to the sidewall of the container 102 which may contribute to a faster and more uniform heating cycle of the food and/or liquid within the interior of the container 102. In some embodiments, the location of the heating element 140 may contribute to the shape of the heating element 140. For example, a heating element 140 coupled to the bottom of the container 102 may be generally circular, which may provide a better fit to a circular bottom of the container 102. Alternatively or additionally, a heating element 140 coupled to the sidewall of the container 102 may have a shape complementary to at least a portion of the sidewall of the container 102 (e.g., its shape may be that of a portion of a cylinder sidewall), which may provide a better fit wrapping around the sidewall of the container 102.

In some embodiments, the heating element 140 may be configured to heat the container 102, which may in turn, heat the food and/or liquid contained within the container 102. In instances in which liquid is the substance within the container 102, the heated liquid near the container 102 may get hotter than the liquid further from the container 102 and the temperature gradient may cause the liquid to move, which may cause convective heating which may result in the liquid being evenly heated throughout. Alternatively or additionally, liquids may be placed in a bag, a bottle, and/or other similar container, and placed in the container 102 along with a liquid external to the bag, bottle, and/or other container. The contents of the container 102 may be heated by the heating element 140 until a target temperature is reached where heat may be directly transferred from the container 102 to the bag, bottle, and/or container of liquid where the two are in direct contact and/or indirectly through the liquid that at least partially fills space between the container 102 and the bag, bottle, and/or other container of liquid.

In some embodiments, soft food may be added to the container 102 to be warmed by the portable heating device 100a. Soft food may include pureed food, mashed food, baby food, and/or other similar foods. In these and other embodiments, the heating element 140 may heat the container 102, which may in turn, heat the soft food within the container 102. In some embodiments, heating soft food within the portable heating device 100a may take longer than heating liquid as heat may not transfer as easily through the soft food. In instances in which additional time may be desired to heat the soft food, a heating cycle timer may be set in conjunction with a target temperature to maintain the target temperature over a period of time, which may contribute to the food heating throughout. For example, when soft food is placed within the container 102 of the portable heat heating device 100*a*, a target temperature and a heating cycle timer may be set. The target temperature may be the desired temperature for the soft food to be and the target time may be a length of time in which the target temperature may be sustained to fully heat the soft food.

In some embodiments, the portable heating device 100*a* may be configured to defrost frozen substances within the container 102. For example, a frozen bag of breast milk may be placed in the container 102 along with an amount of additional liquid, such as water, external to the frozen bag and then heated by the heating element 140 until thawed and/or warmed. The amount of additional liquid may include enough liquid to cover the bottom, interior surface of the container 102 up to a submersion point of all or a portion of the frozen substance.

In some embodiments, solid foods may be warmed in a similar manner as defrosting substances within the container 102. For example, a solid food in a bag or other container may be placed in the container 102 along with a liquid such as water external to the bag or other container of solid food. The contents of the container 102 may be heated by the heating element 140 until a target temperature is reached where heat may be directly transferred from the container 102 to the bag or other container of solid food where the two are in direct contact and/or indirectly through the liquid that at least partially fills space between the container 102 and the bag or other container of solid food. Alternatively or additionally, a heating cycle timer may be set in conjunction with a target temperature to maintain the target temperature over a period of time, which may contribute to the food heating throughout.

In some embodiments, the heat insulation layer 125 may be coupled to and/or positioned to at least partially surround the heating element 140 and/or the container 102. The heat insulation layer 125 may be configured to cover and insulate the heating element 140 from electronics and/or other sensitive components. Alternatively or additionally, the heat insulation layer 125 may reduce the amount of heat transferred to the housing which may reduce the likelihood of a burn to a hand. In some embodiments, the heat insulation layer 125 may be configured to resist high temperatures to protect the electronics, the structure, and/or a user from potential burns. For example, the heat insulation layer 125 may be resistant to temperatures of at least 250 degrees Fahrenheit.

In some embodiments, the heat insulation layer 125 may be configured to cover and/or insulate the temperature sensor 130 from external heat sources which may limit any influence of external heat sources on the temperature sensor 130 to provide a more accurate reading of the temperature of the food and/or liquid within the container 102.

In some embodiments, the heating element 140 may include thin flexible heating components that may be configured to wrap and couple to the container 102. The heating element 140 may include flexible heaters that may include thin film, foil, and or wire wound heating elements that may include different metal alloys such as steel, copper, aluminum, nichrome, and/or other metal alloys. As an example, the heating element 140 may include silicone rubber heaters, polyimide heaters, thick film heaters, various combinations thereof, and/or other thin, flexible heaters. In some embodiments, the wires of the heating element 140 may include resistance wires capable of supporting an output power from the power source 160 of at least 100 watts.

In some embodiments, the controller 150 may be connected to at least the electronic device 120, the temperature sensor 130, and the heating element 140. Alternatively or additionally, the controller 150 may be connected to the power supply 160 in instances where a power supply controller 162 may not be dedicated to the power supply 160. In some embodiments, the controller 150 may include one or more of a microcontroller, a processor, a microprocessor, a system on a chip (SoC), a field programmable gate array (FPGA), an application-specific integrated circuit (ASIC), a programmable logic controller (PLC), and/or other suitable devices.

In some embodiments, the controller 150 may be configured to control the display of the electronic device 120. For example, the controller 150 may determine text, numbers, and/or icons displayed on the electronic device 120. Alternatively or additionally, the controller 150 may be configured to update the display in response to received user input. For example, in instances in which the user selects an option to display temperatures in Celsius, the controller 150 may cause the electronic device 120 to display all temperatures in Celsius.

In some embodiments, the controller 150 may be configured to receive inputs from one or more components and may be configured to direct outputs to one or more components. For example, the controller 150 may be configured to receive inputs from at least the electronic device 120 and the temperature sensor 130 and may be configured to direct output to at least the electronic device 120 and the heating element 140. In an example embodiment, the controller 150 may receive input from the electronic device 120 that may determine a target temperature and may receive input from the temperature sensor 130 that may indicate a current temperature lower than the target temperature, and the controller 150 may cause the heating element 140 to continue to heat the container 102. In another example, the controller 150 may receive input from the electronic device 120 to turn off the portable heating device 100*a* and may cause the heating element 140 to turn off.

In some embodiments, the controller 150 may be configured to interface with additional sensors. For example, the portable heating device 100*a* may include one or more accelerometers configured to determine various accelerations of the portable heating device 100*a*. For example, the accelerometers may detect when the portable heating device 100*a* has reached a tipping point, has been dropped, and/or other unsafe situations. In instances where the accelerometers of the portable heating device 100*a* detect an unsafe situation, the accelerometers may alert the controller 150 of the unsafe situation which may disable the heating element 140 and/or other components of the portable heating device 100*a*.

In some embodiments, the controller 150 may be configured to determine and/or provide notifications to the user regarding the status of the portable heating device 100*a*. For example, the controller 150 may direct the electronic device 120 to display a notification that a heating cycle is complete. In some embodiments, the notification on the electronic device 120 may include a message, a light indication, a vibration, and/or other notifications.

In some embodiments, the controller 150 may be configured to transmit and/or receive messages and/or commands from an external device. In some embodiments, the controller 150 may receive commands from the external device that may direct operations of the portable heating device 100*a*. For example, a remote user may set a target temperature and initiate a heating cycle using an external device. In some embodiments, an application, such as a mobile application, may be used as an interface for the user to remotely interact with and control the portable heating device 100*a*.

In some embodiments, an external device may include an electronic or digital computing device capable of transmitting and receiving wireless communications. Examples of an external device may include a mobile phone, a tablet computer, a desktop computer, a smart watch, and/or other similar personal computing devices. Wireless communications may include Bluetooth®, Wi-Fi, WiMAX, cellular communications, and/or other similar wireless networks.

In some embodiments, the controller 150 may transmit messages that may include any of the settings and/or statuses in relation to the electronic device 120. For example, the controller 150 may transmit a wireless message to a mobile device indicating the heating cycle is complete. In some embodiments, the wireless message may include a text message, a notification tied to a mobile application, and/or other similar wireless notification.

In instances in which the controller 150 wirelessly transmits information to a mobile application, the mobile application may be capable of displaying any of the information and/or statuses as shown on the electronic device 120. For example, a mobile application may display the current temperature, the target temperature, warnings and/or notifications to the user, current battery level, current time, time remaining on current heating cycle timer, time of last heating cycle, and/or other similar displays.

In some embodiments, the power supply 160 may be operably connected to at least the electronic device 120, the temperature sensor 130, the heating element 140, the controller 150, and the power supply controller 162. In these and other embodiments, the power supply 160 may be configured to deliver power to devices consistent with operation of the portable heating device 100*a*. For example, in instances when the controller 150 determines the current temperature is less than the target temperature, the power supply 160 may be directed to supply power to the heating element 140 to warm the food and/or liquid within the container 102.

In some embodiments, the power supply 160 may include a fixed power source, such as a 110V power outlet. Alternatively or additionally, the power supply 160 may include one or more batteries. In instances in which the power supply 160 includes one or more batteries, the power supply 160 may include one or more rechargeable batteries. In some embodiments, the rechargeable battery materials of the power supply 160 may include lithium-ion, lithium-ion polymer, lithium iron phosphate, nickel-metal hydride, and/or other rechargeable battery materials.

In embodiments where the power supply 160 includes rechargeable batteries, the rechargeable batteries may be configured to provide a continuous discharge rating between 2 amps and 12 amps. For example, a rechargeable battery power supply 160 may be configured to provide a continuous discharge rating of at least 6 amps.

In embodiments where the power supply 160 includes rechargeable batteries, the rechargeable batteries may include a nominal capacity between 1500 milliamp hours and 5000 milliamp hours. For example, a rechargeable battery power supply 160 may include a nominal capacity of at least 2000 milliamp hours.

In embodiments where the power supply 160 includes rechargeable batteries, the rechargeable batteries may include a voltage between 7.2 volts and 21.6 volts. For example, a rechargeable battery power supply 160 may include a voltage of at least 14.4 volts.

In these and other embodiments, the rechargeable batteries may include one or more batteries connected in series that may enable the rechargeable batteries to achieve the desired amps, milliamp hours, and voltage as the power supply 160. For example, four lithium-ion batteries may be connected in series and may collectively supply a continuous discharge rating of at least 10 amps, a nominal capacity of at least 2000 milliamp hours, and a combined voltage of at least 14.4 volts. In some embodiments, the arrangement of rechargeable batteries may be configured to collectively output power between approximately 100 watts and 200 watts. For example, the rechargeable batteries may be configured to collectively deliver approximately 130 watts of power during operation of the portable heating device 100*a*.

In instances in which the power supply 160 includes a combination of fixed power and battery power, the portable heating device 100*a* may be configured to operate using the fixed power supply, and may also continue to charge the one or more batteries of the power supply 160. For example, in instances where the portable heating device 100*a* is connected to a fixed power source and performing a heating cycle, the one or more batteries of the power supply 160 may continue to charge until the power supply controller 162 determines the one or more batteries are fully charged (described in further detail below), and the one or more batteries are then disconnected from charging. In instances in which the fixed power supply is removed from the portable heating device 100*a* during a heating cycle, the one or more batteries of the power supply 160 may activate, such that the current heating cycle of the portable heating device 100*a* may be uninterrupted. Similarly, in instances in which the power supply 160 of a heating cycle is provided by one or more batteries and the portable heating device 100*a* is subsequently connected to a fixed power supply, the one or more batteries may disengage, such that the portable heating device 100*a* may be powered by the fixed power supply and the one or more batteries may charge, as needed.

In some embodiments, the controller 150, the power supply 160, and the power supply controller 162 may be disposed in the lower housing 104*b*. Alternatively or additionally, either of the controller 150 or the power supply controller 162 may be disposed in the upper housing 140*a*, as space may permit. In some embodiments, the power supply 160 may be sized to fill the space provided in the lower housing 104*b*. In some embodiments, the lower housing 104*b* may be separated from the upper housing 104*a* with a thermal resistant structure, which may reduce the amount of heat transferred from the heating element 140 to the power supply 160 and/or the power supply controller 162. Alternatively or additionally, the heat insulation layer 125 that at least partially surrounds the heating element 140 may obviate the inclusion of additional thermal resistance between the upper housing 104*a* and the lower housing 104*b*.

In some embodiments, the power supply controller 162 may be connected to the power supply 160. In instances in which the power supply 160 includes one or more rechargeable batteries, the power supply controller 162 may be configured to regulate the charging and discharging of the one or more rechargeable batteries. For example, the power supply controller 162 may monitor the one or more batteries of the power supply 160 to prevent overcharging and/or undercharging. In instances in which the power supply controller 162 detects the one or more batteries are fully charged, the power supply controller 162 may remove the power input to the batteries to prevent overcharging.

Alternatively or additionally, the power supply controller 162 may be configured to monitor the operating environment of the power supply 160 and may alter the state of the power supply 160 in instances in which the operating environment is detrimental to the power supply 160. For example, in instances where the power supply controller 162 detects moisture in the lower housing 104b, the power supply controller 162 may disable the power supply 160 which may mitigate damage to the power supply 160.

Figure 1B:
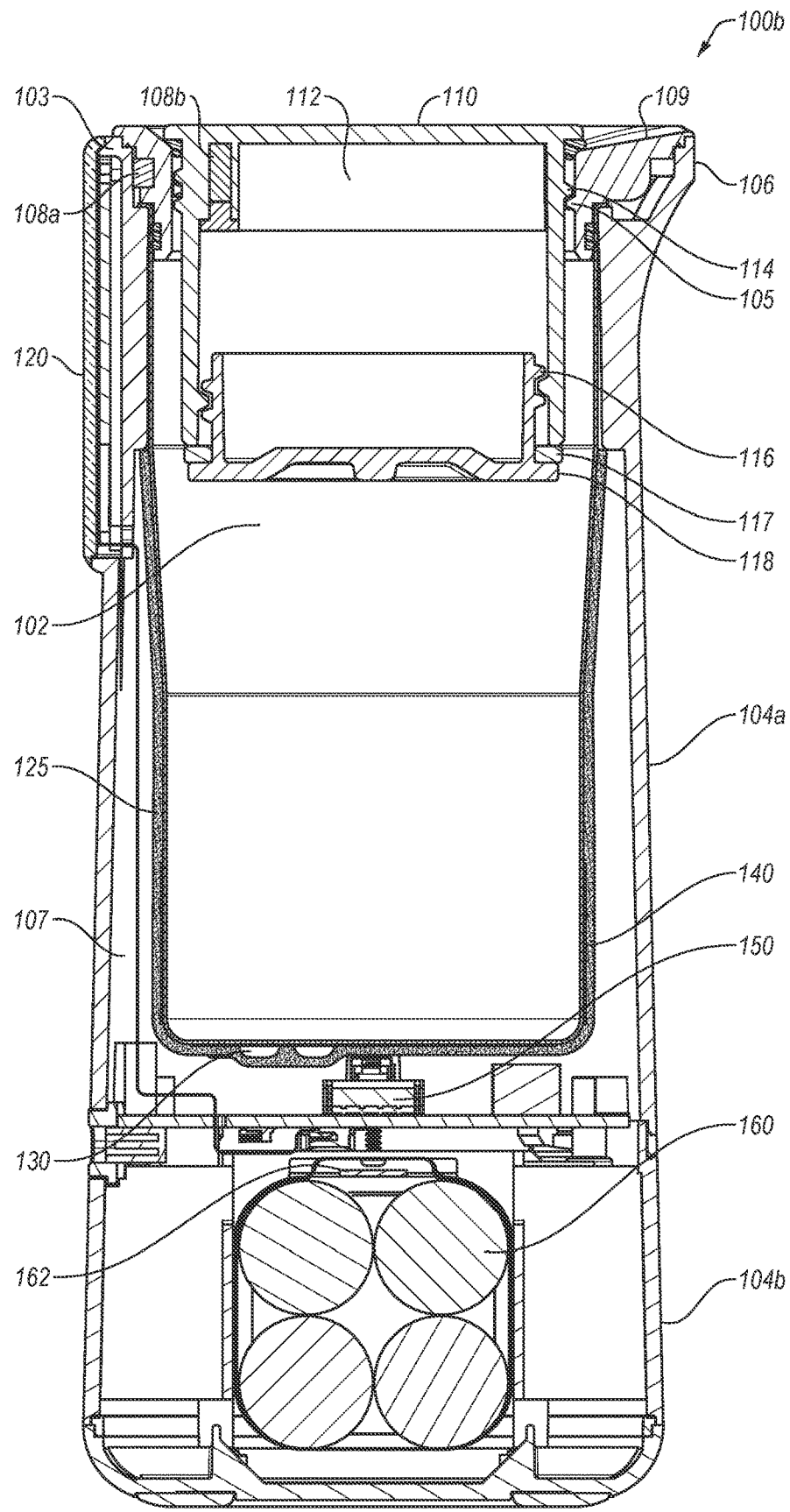
FIG. 1B is a cross-sectional view of another example portable heating device.

FIG. 1B is a cross-sectional view of another example portable heating device 100b, in accordance with at least one embodiment described in the present disclosure. The portable heating device 100b may include analogous elements to the portable heating device 100a of FIG. 1A, including a container 102, an upper housing 104a, a lower housing 104b (hereinafter housing 104), a lid 110, an electronic device 120, a temperature sensor 130, a heating element 140, a controller 150, a power supply 160, and a power supply controller 162. The housing 104 may include a superior edge 103, an upper housing 104a, a lower housing 104b, inner threads 105, a spout 106, a cavity 107, a first lid sensor 108a, and a spout overlay 109. The lid of the portable heating device 100b may include a lid cavity 112, outer threads 114, lid inner threads 116, a gasket 117, and an internal cap 118.

In some embodiments, the lid cavity 112 may include a cylindrical cavity formed within the lid 110, where the opening to the lid cavity 112 may be adjacent to the top of the container 102. In some embodiments, the lid cavity 112 may be in fluid communication with the interior of the container 102. Alternatively or additionally, the lid cavity 112 may be separate from the interior of the container 102, such as by the internal cap 118. In some embodiments, an inferior, interior surface of the lid 110 may include the lid inner threads 116. The lid inner threads 116 may include a helical ridge that may be sized and configured to receive a complementary second helical ridge of another object. In some embodiments, the internal cap 118 may be sized and configured to cover and seal the lid cavity 112. The internal cap 118 may include threads that may also be helical and complementary to the lid inner threads 116. For example, the threads of the internal cap 118 may be configured to screw into the lid inner threads 116, which may hermetically seal the lid cavity 112. Optionally, the gasket 117 may be disposed adjacent to a lip of the inner cap 118 and may be compressed between the lip of the inner cap 118 and a lower circular surface of the lid cavity 112 to hermetically seal the lid cavity 112 when the internal cap 118 is screwed into the lid cavity 112.

Alternatively or additionally, the internal cap 118 may omit threads and may instead include a gasket disposed or formed on an external surface of the internal cap 118. The gasket may include rubber, silicone, and/or other materials. In such instances, the internal cap 118 may be inserted as a stopper into the lid cavity 112 where the gasket may seal against an interior surface of the lid 110 within the lid cavity 112 to seal the lid cavity 112 in a closed configuration. In such embodiments, an outer diameter of the gasket may slightly exceed an inner diameter of the lid cavity 112 such that it is compressed when the internal cap 118 is inserted into the lid cavity 112, the internal cap 118 with gasket thereby hermetically sealing the lid cavity 112 and remaining in place within the lid cavity 112 via friction fit.

In some embodiments, the lid cavity 112 may store one or more accessories that may be used in conjunction with the portable heating device 100b. For example, the lid cavity 112 may be sized and configured to store cleaning supplies, measuring cups, power cables for charging the portable heating device 100b, breast milk storage bags, and/or other accessories.

In some embodiments, the lid cavity 112 may be used in conjunction with the internal cap 118 as an accessory. For example, an embodiment of the internal cap 118 may include a metal, cylindrical rod running vertically down the center of the container 102, the rod including a closed end and an end that includes an opening into the lid cavity 112 or that is in fluid communication with the lid cavity 112. Additionally, cold water and/or ice may be located in the rod and/or the lid cavity 112 which may be used to keep the contents of the container 102 cold until a desired time to heat the contents.

The lid cavity 112 may have a volume such as ¼ cup, ⅓ cup, ⅔ cup, ¾ cup, 1 cup, 10 milliliters (mL), 100 mL, 200 mL, 400 mL or less or greater volume than the foregoing. In some embodiments, the lid 110 may include volume markings on the interior of the lid cavity 112 to use the lid 110 as a measuring cup. In another example, the lid cavity 112 may store a UV light sanitation device that may be used to sanitize the portable heating device 100b or portion thereof (such as an interior of the container 102) before or after use.

In some embodiments, the lid cavity 112 may be used to store food and/or liquid. For example, in instances where coffee is heated within the portable heating device 100b, cream or sugar may be stored within the lid cavity 112. In another example, baby formula may be stored in the lid cavity 112 with water stored in the container 102 until the mixed formula is desired.

Figure 2:
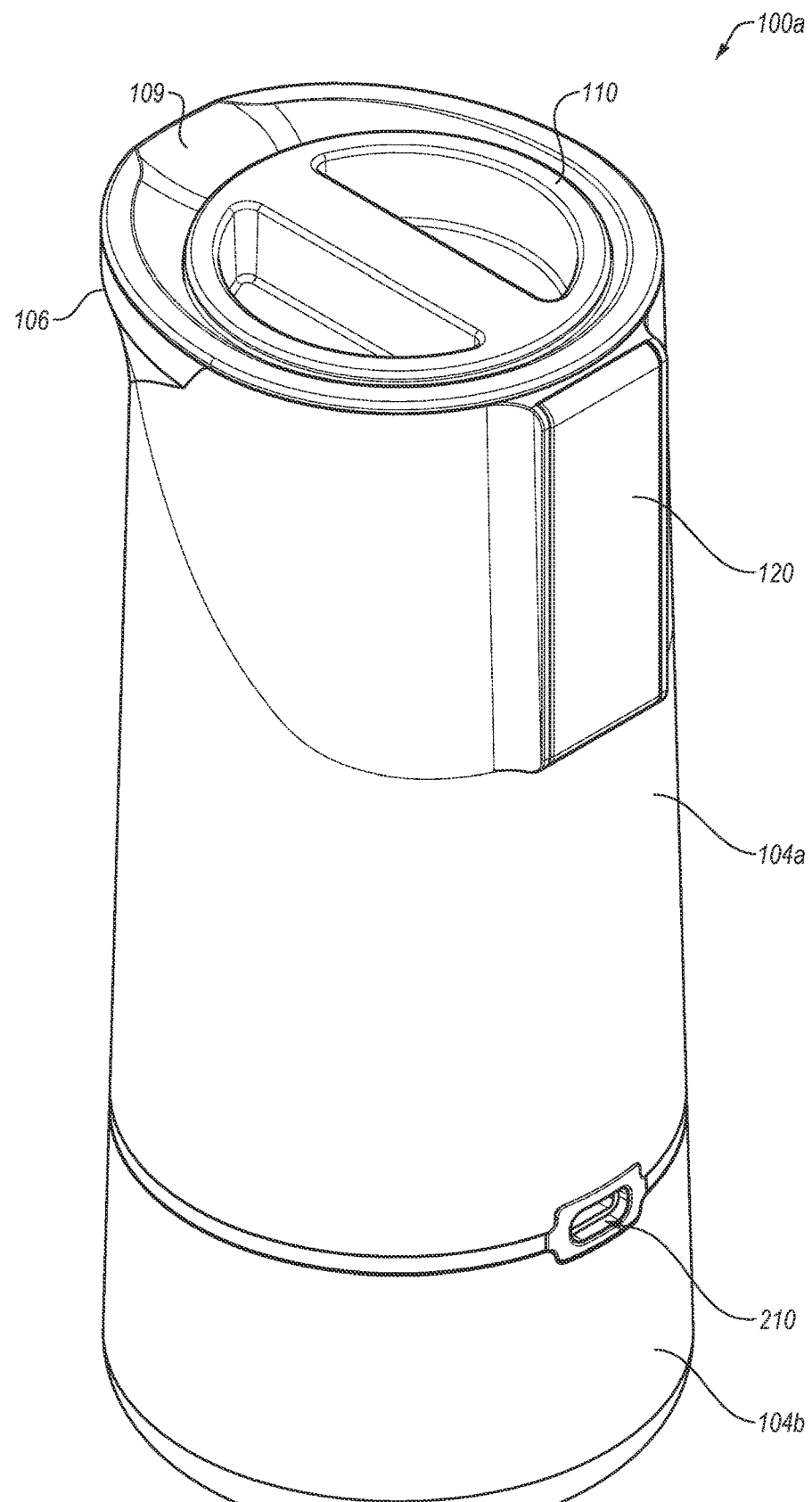
FIG. 2 is a perspective view of the portable heating device of FIG. 1A.

FIG. 2 is a perspective view of the portable heating device 100a of FIG. 1A, in accordance with at least one embodiment described in the present disclosure. As illustrated in FIG. 2, the portable heating device 100a may include a charging port 210.

In some embodiments, the housing 104 may be configured to generally protect the interior elements. The housing 104 may include durable materials that may provide protection to the interior components, including damage from physical contact, such as dropping, tipping over, and/or everyday wear and tear, and/or external debris such as water and/or dust. For example, the housing 104 may include plastic, silicone, ceramic, metals including stainless steel, copper, aluminum, and/or other materials, and/or combinations thereof. In these and other embodiments, the housing 104 may inhibit water, dust, and/or other debris from entering an interior portion of the housing 104. For example, the housing 104 may include an ingress protection code (IP Code) of IPX5 or greater.

In some embodiments, the charging port 210 may be configured to connect an internal power supply located within the housing 104, such as power supply 160 of FIG. 1A, to a fixed power source, such as a 110V power outlet, a car electrical system, and/or other power sources. In some embodiments, when a fixed power source is connected to the internal power supply of the portable heating device 100a via the charging port 210, the portable heating device 100a may operate using power from the fixed power source. Alternatively or additionally, the fixed power source may be configured to charge the internal power supply located within the housing 104 via the charging port 210. In these and other embodiments, in instances in which the portable heating device 100a is connected to a fixed power source via the charging port 210, the portable heating device 100a may be configured to charge the internal power supply while enabling operation of the portable heating device 100a.

In some embodiments, the charging port 210 may be configured to receive different configurations of power adapters that may convert the fixed power supply such that the portable heating device 100a may charge the internal power supply and/or operate the portable heating device 100a. For example, the charging port 210 may include USB Type C, USB Type A, USB Type B, Micro USB, Thunderbolt™, and/or other port configurations. In instances in which the charging port 210 is a USB Type C configuration, the charging port 210 may include a seamless outer shell and a seal that may be disposed around the charging port 210. The seal may include rubber, silicone, plastic, and/or other debris resistant material. Alternatively or additionally, similar water, dust, and/or other debris resistant elements, including seamless outer shells and seals, may be employed in other variants of the charging port 210 configurations.

In some embodiments, the charging port 210 may be configured to inhibit water, dust, and/or other debris from entering the interior portion of the portable heating device 100a. In some embodiments, the charging port 210 may include protection equal to or greater than the overall protection of the housing 104. For example, the charging port 210 may include an IP Code of IPX5 or greater. In some embodiments, the charging port 210 may include a stopper configured to cover and/or plug the charging port 210 when a charging cable is not plugged therein. Covering and/or plugging the charging port 210 with a stopper may improve the protection and rating against water, dust, and/or other debris from entering the interior of the portable heating device 100a through the charging port 210.

Figure 3:
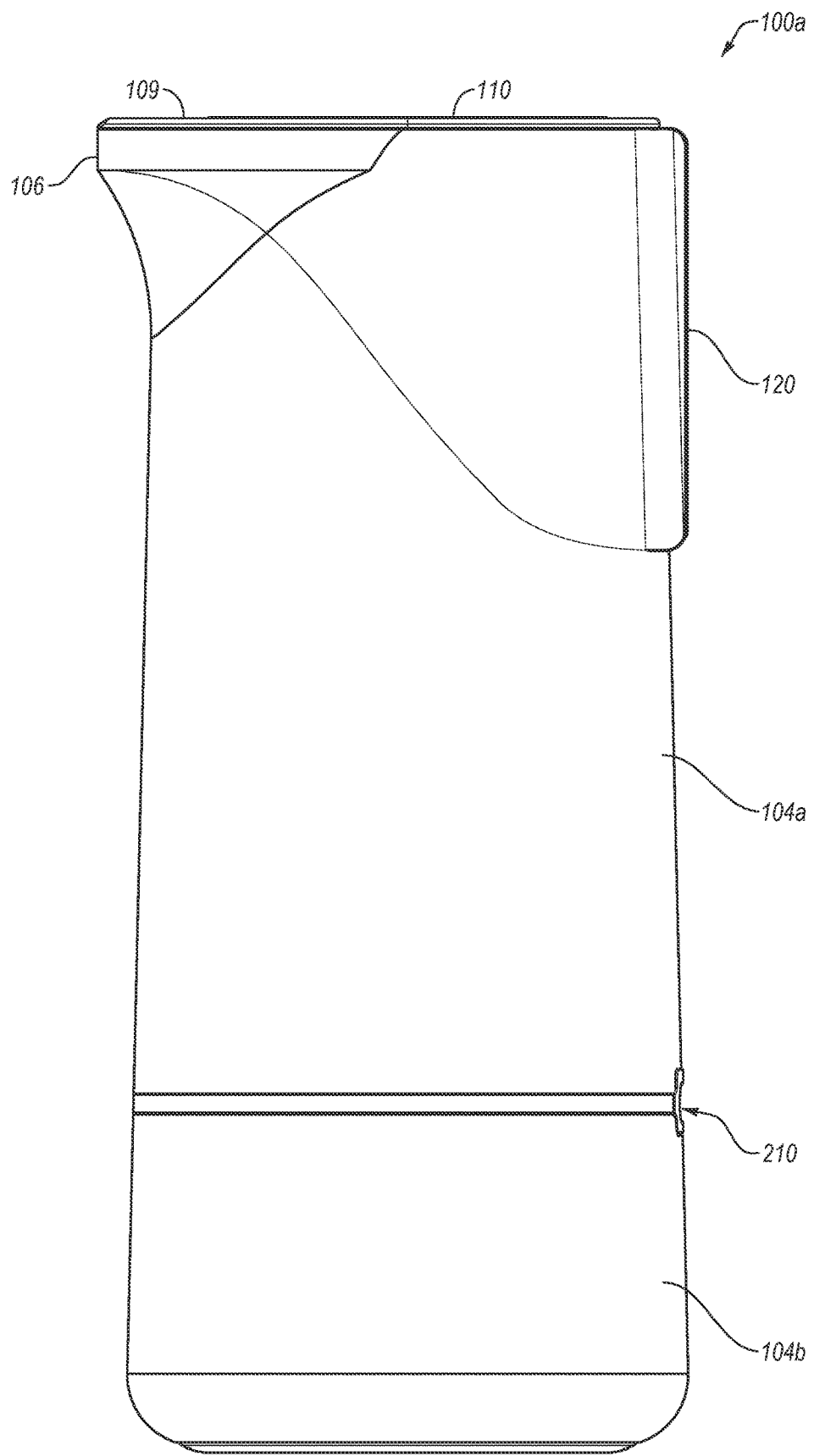
FIG. 3 is a side view of the portable heating device of FIG. 1A.

FIG. 3 is a side view of the portable heating device of FIG. 1A, in accordance with at least one embodiment described in the present disclosure. As illustrated in FIG. 3, the spout 106 may protrude from the upper end of the upper housing 104a, as described relative to FIG. 1A. In some embodiments, the spout 106 may be substantially flush with the upper housing 104a or may extend approximately 0.35 inches from the upper housing 104a, and/or an amount between flush and approximately one inch. For example, the spout 106 may extend approximately one half of an inch from the upper housing 104a.

In some embodiments, the electronic device 120 may be configured to protrude from a lateral portion of the housing 104. Alternatively or additionally, the electronic device 120 may be substantially flush with the upper housing 104. For example, the housing 104 may include a cavity configured to receive the electronic device 120. The cavity may be recessed into the housing 104 such that an outward-facing surface of the electronic device 120 is substantially flush with an outer surface of the housing 104, or the cavity may be formed by a protrusion of the housing 104 such that the electronic device 120 partially and/or fully protrudes from the housing 104. In some embodiments, the electronic device may protrude between approximately two millimeters to approximately fifteen millimeters.

In some embodiments, a face portion of the electronic device 120 may be substantially vertical when secured within the housing 104. Alternatively or additionally, the face portion of the electronic device 120 may be tilted upward or downward when secured within the housing 104 such that the electronic device 120 may be more easily viewed.

Figure 4:
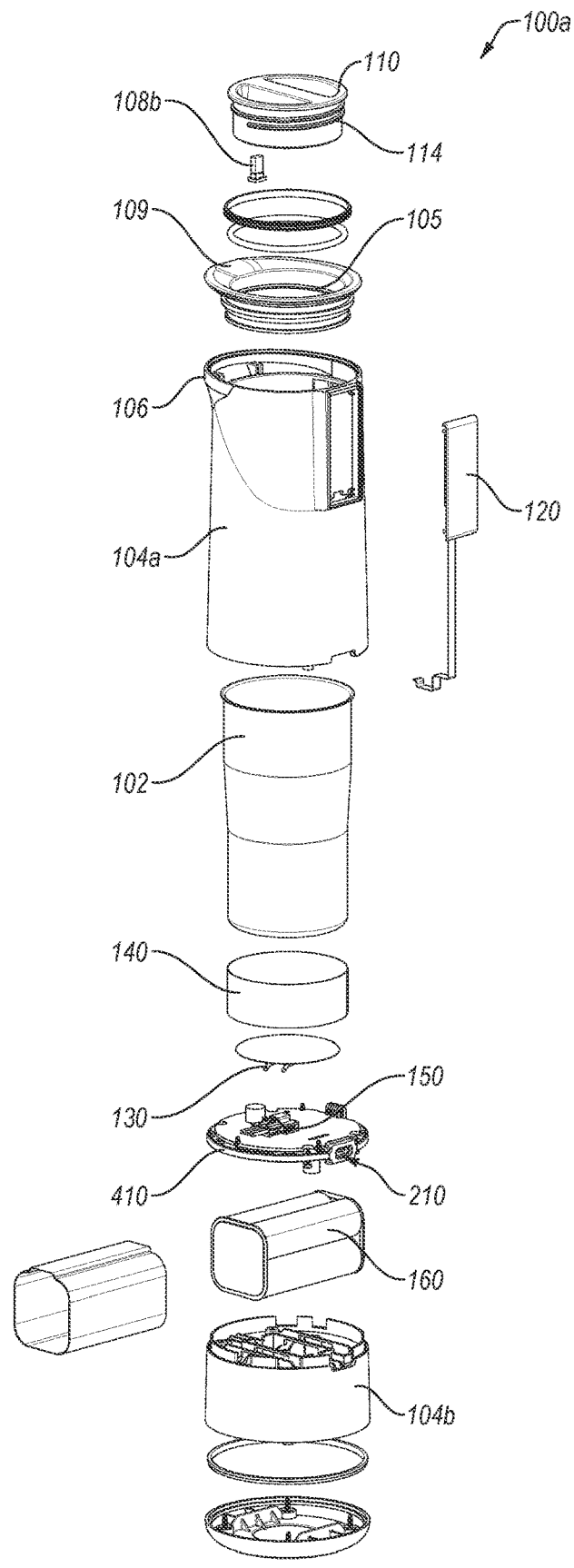
FIG. 4 is an exploded perspective view of the portable heating device of FIG. 1A.

FIG. 4 is an exploded perspective view of the portable heating device 100a of FIG. 1A, in accordance with at least one embodiment described in the present disclosure. As illustrated in FIG. 4, the portable heating device 100a may include a light pipe 410.

In some embodiments, a spout overlay 109 may be configured to be affixed to an upper portion of an upper housing 104a. Alternatively or additionally, the spout overlay 109 may be bonded to a container 102 and/or to the upper housing 104a.

In some embodiments, an electronic device 120 may include one or more cables configured to electrically couple the electronic device 120 to a controller 150.

In some embodiments, a temperature sensor 130 may be disposed on a bottom, exterior surface of the container 102.

In some embodiments, the controller 150 may be disposed in a housing 104 and may be where the upper housing 104a joins a lower housing 104b. In some embodiments, the controller 150 may be adjacent to a charging port 210.

In some embodiments, the lower housing 104b may attach to the upper housing 104a such that the charging port 210 may be disposed between the lower housing 104b and the upper housing 104a. In some embodiments, the charging port 210 may be attached to the light pipe 410. The light pipe 410 may be disposed between the upper housing 104a and the lower housing 104b. In some embodiments, the light pipe 410 may be configured to display different lights associated with different actions of the portable heating device 100a. For example, the light pipe 410 may display a first color to indicate when the portable heating device 100a is in a warming cycle, a second color to indicate when the portable heating device 100a is charging, and/or other colors associated with other actions.

FIGS. 5A-5G illustrate example user interfaces (UIs) 510, 520, 530, 540, 550, 560, and 570, respectively, of an electronic device, such as the electronic device 120 of FIG. 1A, in accordance with at least one embodiment described in the present disclosure. The UIs may be displayed on a display of the electronic device. The UIs include first, second, third, fourth, fifth, sixth, and seventh UIs 510, 520, 530, 540, 550, 560, 570. The terms "first", "second", "third", "fourth", "fifth", "sixth" and "seventh" as applied to the UIs 510, 520, 530, 540, 550, 560, 570 are used merely to distinguish one UI from another and should not be interpreted as indicative of an order in which they are presented or shown to a user or of their relative importance.

Figure 5A:
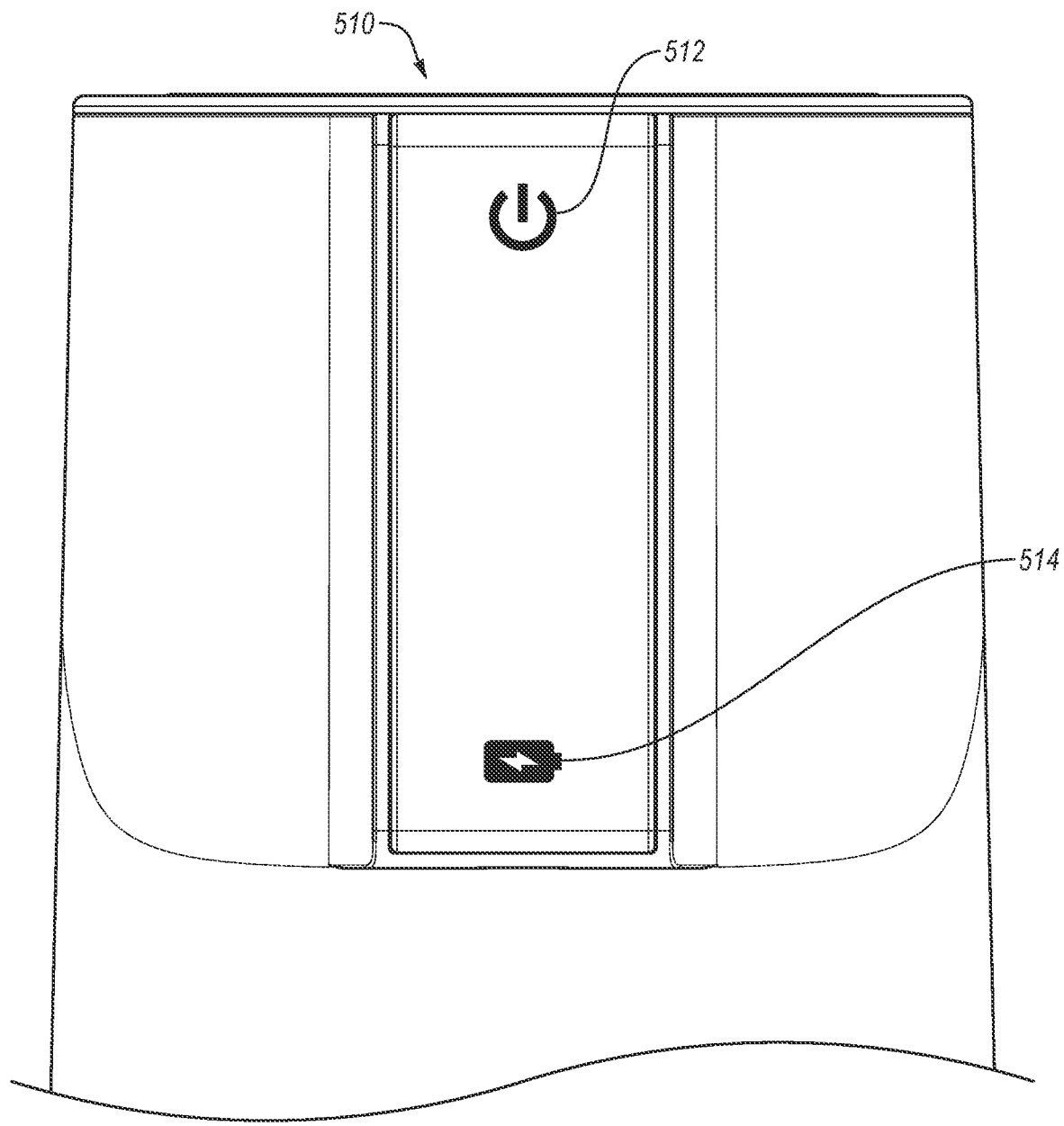
FIGS. 5A-5G illustrate example displays of an electronic device.

FIG. 5A illustrates the first UI 510 of the electronic device. In some embodiments, the first UI 510 may be displayed on the display of the electronic device when an associated device, such as the portable heating device 100a of FIG. 1A, is powered down. In some embodiments, the first UI 510 may include a power icon 512 and a battery icon 514.

In some embodiments, the power icon 512 may include a touchscreen icon. In response to the electronic device detecting a press of the power icon 512 by a user, the electronic device may be configured to power up and/or power down the associated device (e.g., the portable heating device 100a). Alternatively or additionally, in instances in which the associated device is on and in response to the electronic device detecting a press of the power icon 512 by the user, the associated device may transition to a sleep or inactive mode. In some embodiments, the associated device may remain in the sleep or inactive mode until the electronic device detects a press of the power icon 512 by the user or the associated device is moved. The power icon 512 may be displayed on all of the UIs related to the electronic device, examples of which are illustrated in FIGS. 5A-5G, or on only some of the UIs related to the electronic device.

In some embodiments, the battery icon 514 may provide an indication of a current status of a power supply of the associated device, such as power supply 160 of FIG. 1A. For example, a lightning bolt within the battery symbol of the battery icon 514 as illustrated in FIG. 5A may indicate the associated device is currently plugged into a fixed power supply and/or a battery of the associated device is charging. In instances in which the power supply of the associated device is one or more batteries, the battery icon 514 may be configured to provide an indication to the user of an available charge remaining in the power supply. For example, where available charge of the power supply is at approximately half capacity, the battery icon 514 may include a battery outline with half of the battery outline filled in and half of the battery outline empty. In some embodiments, the battery icon 514 may include displays for approximately full, 75% of full, 50% of full, 25% of full, and empty, and/or various amounts in between. For example, the battery icon 514 may display a continuum representing the current available charge in the power supply. Alternatively or additionally, the battery icon 514 may include a percentage displayed next to it or in it, which may indicate an approximate percentage of available charge in the power supply.

Figure 5B:
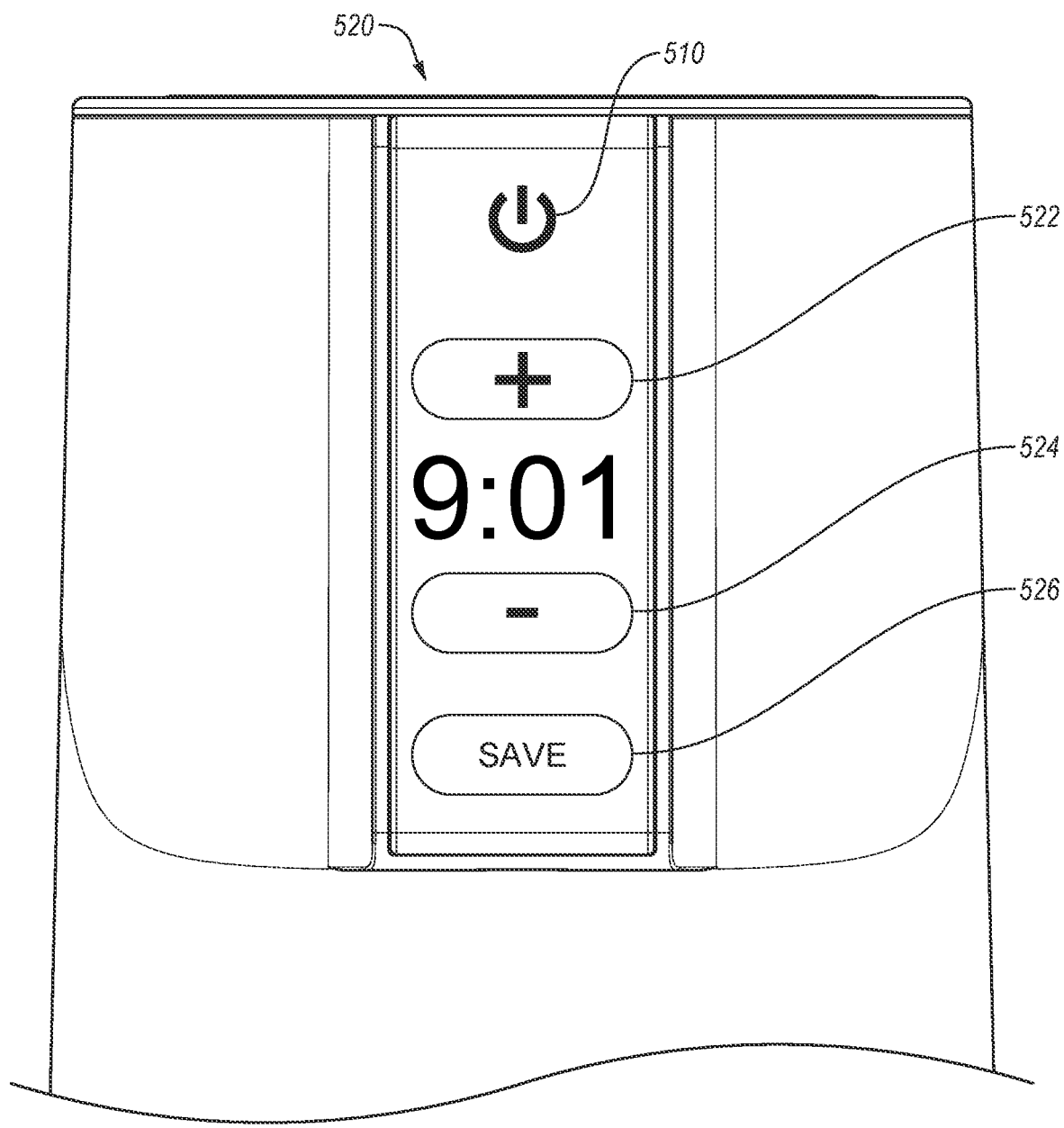

FIG. 5B illustrates the second UI 520 of the electronic device. In some embodiments, the second UI 520 may provide an interface where the user may set or modify a current time. In some embodiments, the second UI 520 may include the power icon 512, an increment button 522, a decrement button 524, and a save button 526.

In some embodiments, the current time displayed on the second UI 520 may be modified by the user pressing and releasing either of the increment button 522 or the decrement button 524. For example, the user may increment the current time by ten minutes by pressing and releasing the increment button 522 ten times. Alternatively or additionally, either of the increment button 522 and/or the decrement button 524 may be continuously held such that the current time may be altered by five-minute increments and/or decrements for every one second of button press. Alternatively or additionally, the increment and/or decrement of the time may become larger the longer either of the increment button 522 and/or the decrement button 524 may be continuously pressed. For example, after three seconds, the amount of increment and/or decrement may increase from five minutes to thirty minutes such that making large changes in the current time may be faster. There may be any number of increment and/or decrement amounts, such as five-minute, ten-minute, fifteen-minute, thirty-minute, sixty-minute, and/or amounts lesser or greater than the foregoing.

In some embodiments, in response to the save button 526 being depressed, the electronic device may be configured to store the displayed current time that may have been altered by the user using the increment button 522 and/or the decrement button 524. In some embodiments, after the save button 526 is pressed, the second UI 520 may change to a different UI on the display of the electronic device.

Figure 5C:
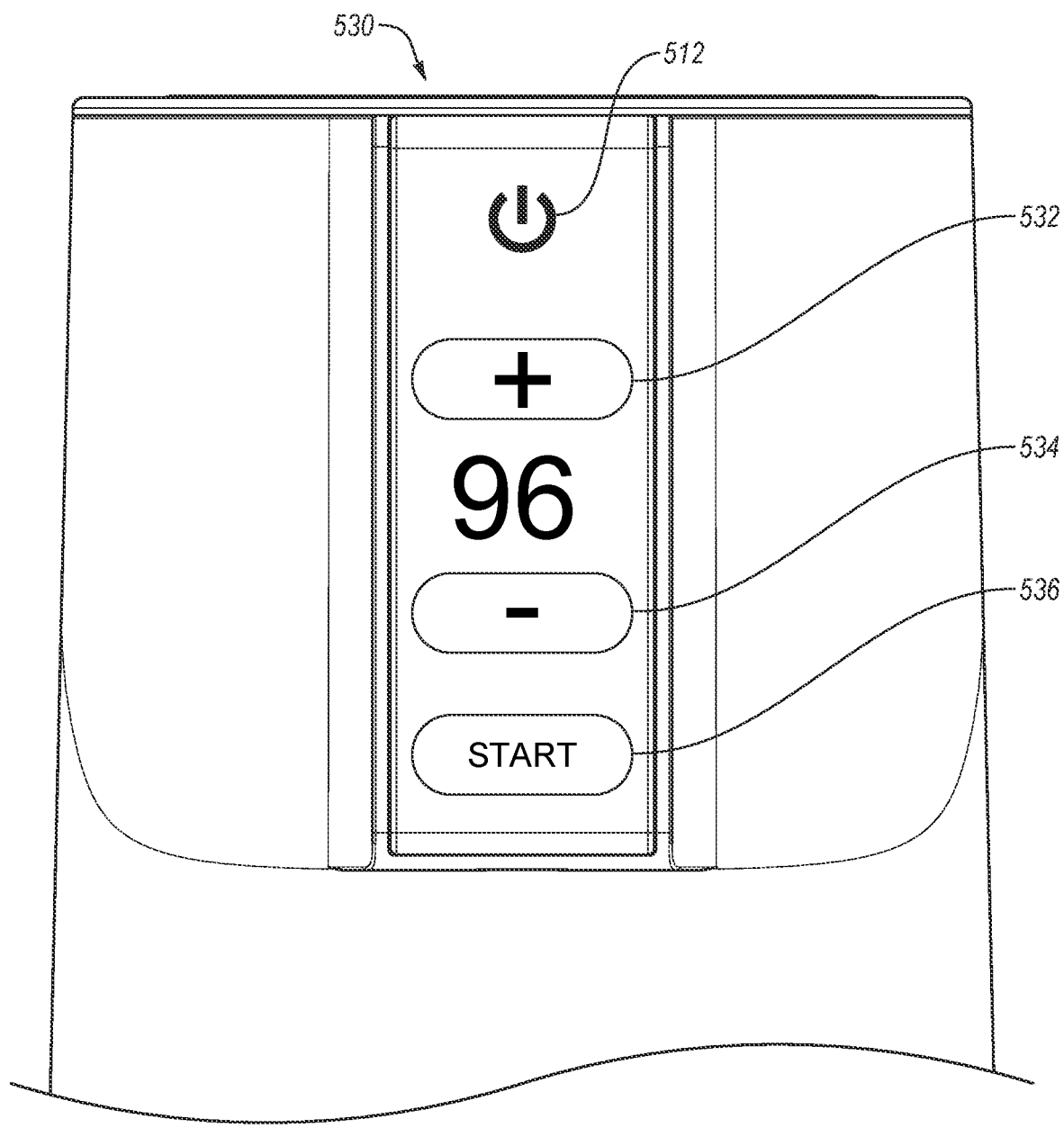

FIG. 5C illustrates the third UI 530 of the electronic device. In some embodiments, the third UI 530 may provide an interface where the user may modify a target temperature. In some embodiments, the third UI 530 may include the power icon 512, an increment button 532, a decrement button 534, and a start button 536. The increment button 532 and the decrement button 534 may be analogous to the increment button 522 and the decrement button 524, respectively.

In some embodiments, the target temperature displayed on the third UI 530 may be modified by the user pressing and releasing either of the increment button 532 or the decrement button 534. Alternatively or additionally, either of the increment button 532 and/or the decrement button 534 may be continuously held such that the target temperature may be altered by five-degree increments and/or decrements (or other increment/decrement) for every one second (or other duration) of continuous button press.

In some embodiments, in response to the start button 536 being pressed, the electronic device may be configured to store the displayed target temperature that may have been altered by the user using the increment button 532 and/or the decrement button 534 and may begin a heating cycle on the associated device. In some embodiments, after the start button 536 is pressed, the third UI 530 may change to a different UI on the display of the electronic device.

Figure 5D:
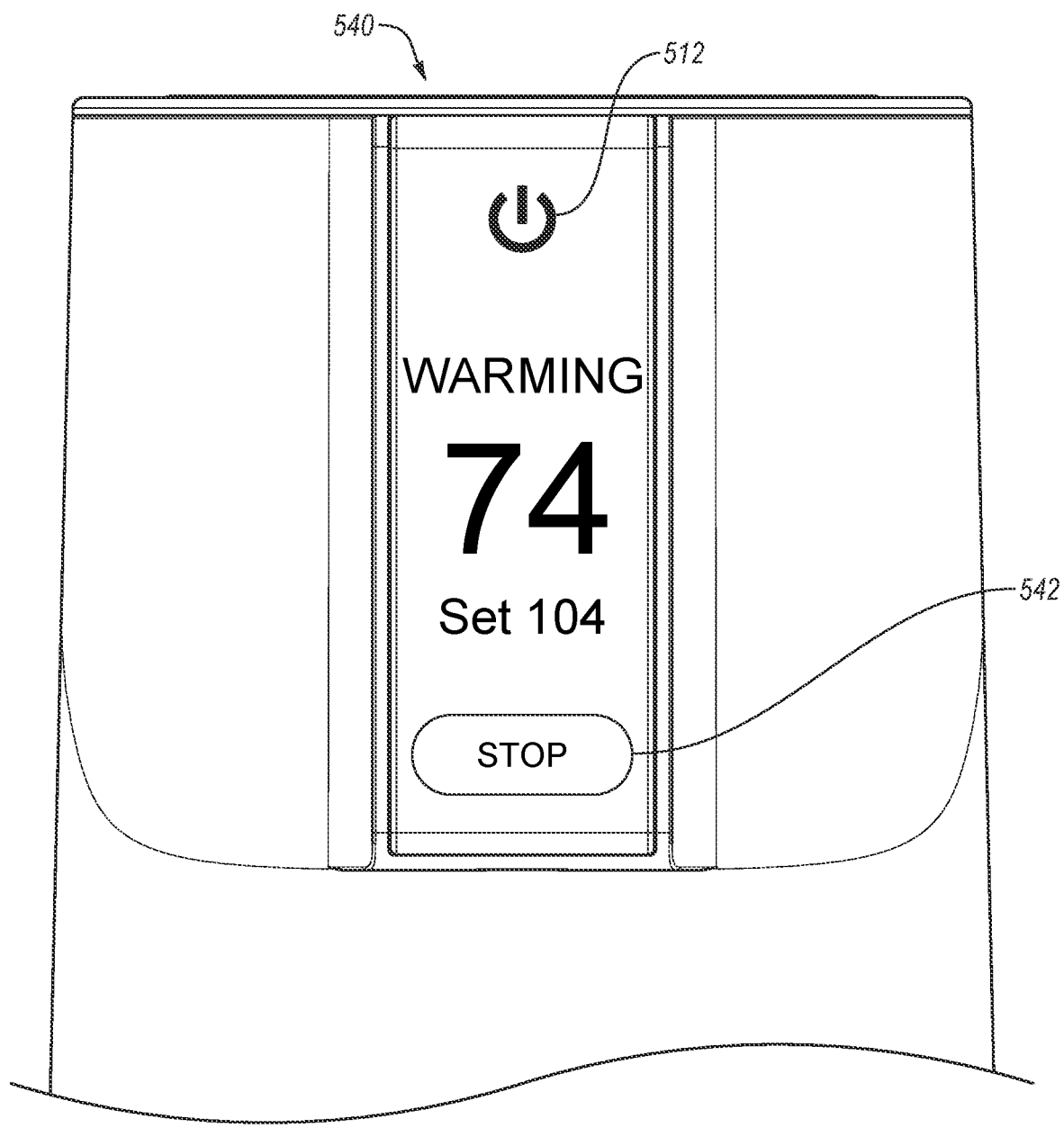

FIG. 5D illustrates the fourth UI 540 of the electronic device. In some embodiments, the fourth UI 540 may provide an interface where the user may monitor a current temperature and a target temperature. In some embodiments, the fourth UI 540 may include the power icon 512 and a stop button 542.

In some embodiments, the fourth UI 540 may indicate a current status of a heating cycle. For example, the fourth UI 540 may include text such as "warming" that indicates a heating cycle is currently operating. In some embodiments, the fourth UI 540 may include a current temperature. The current temperature may display in larger and/or more prominent text. Alternatively or additionally, the fourth UI 540 may include a target temperature that the heating cycle is warming to.

In some embodiments, in response to the stop button 542 being pressed, the electronic device may be configured to cancel or terminate a current heating cycle. In some embodiments, after the stop button 542 us pressed, the fourth UI 540 may change to a different UI on the display of the electronic device.

Figure 5E:
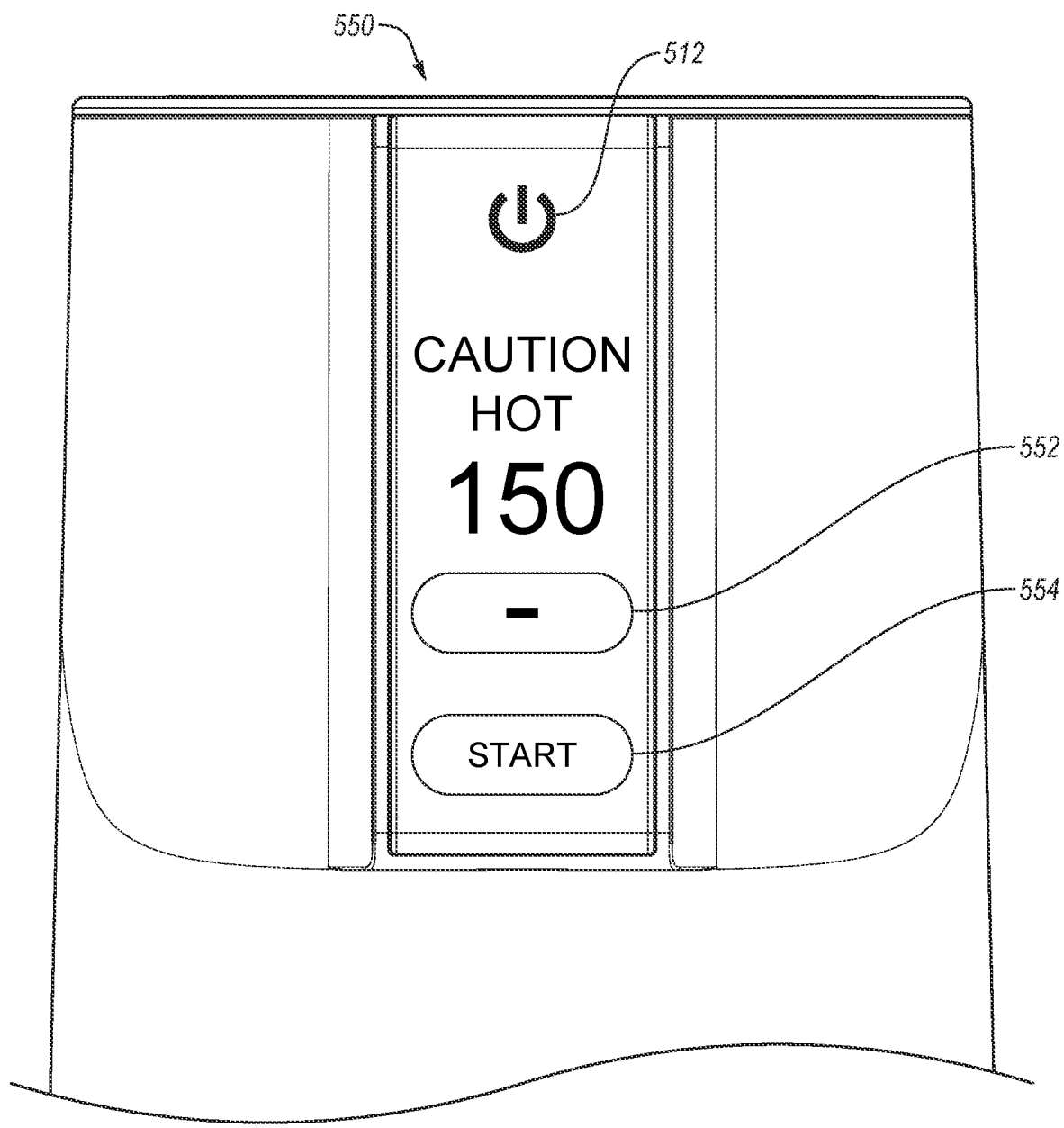

FIG. 5E illustrates the fifth UI 550 of the electronic device. In some embodiments, the fifth UI 550 may provide an interface where a caution and a current temperature may be displayed to the user. In some embodiments, the fifth UI 540 may include the power icon 512, a decrement button 552, and a start button 554.

In some embodiments, the fifth UI 550 may indicate a current status of a heating cycle. For example, the fifth UI 550 may include text such as "caution" and/or "hot" indicating a heating cycle may have completed and that the contents may be hot. Alternatively or additionally, the fifth UI 550 may include a current temperature, and/or the temperature that the heating cycle last realized.

In some embodiments, the fifth UI 550 may be analogous to the third UI 530 relative to the decrement button 552. Alternatively or additionally, the decrement button 552 may be analogous in function to the decrement button 534 of the third UI 530. In some embodiments, a complementary increment button may not be present as the target temperature may be at a maximum safe setting.

In some embodiments, in response to the start button 554 being pressed, the electronic device may be configured to store the displayed target temperature that may have been set or altered by the user and may begin a heating cycle on the associated device. In some embodiments, after the start button 554 is pressed, the fifth UI 550 may change to a different UI on the display of the electronic device.

Figure 5F:
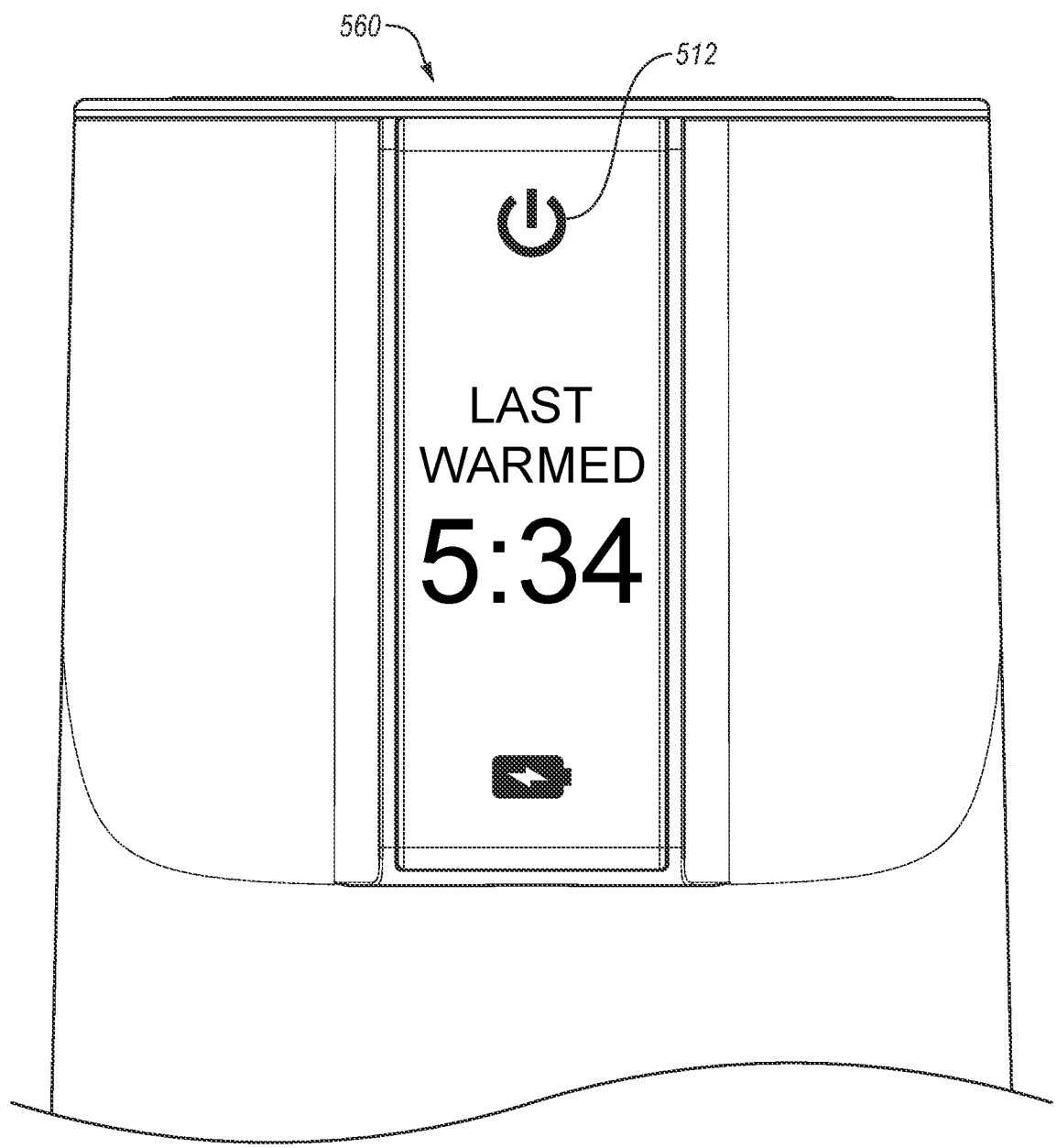

FIG. 5F illustrates a sixth UI 560 of the electronic device. In some embodiments, the sixth UI 560 may provide an interface where the user may monitor a displayed time when a heating cycle was last performed. In some embodiments, the sixth UI 560 may include the power icon 512.

Figure 5G:
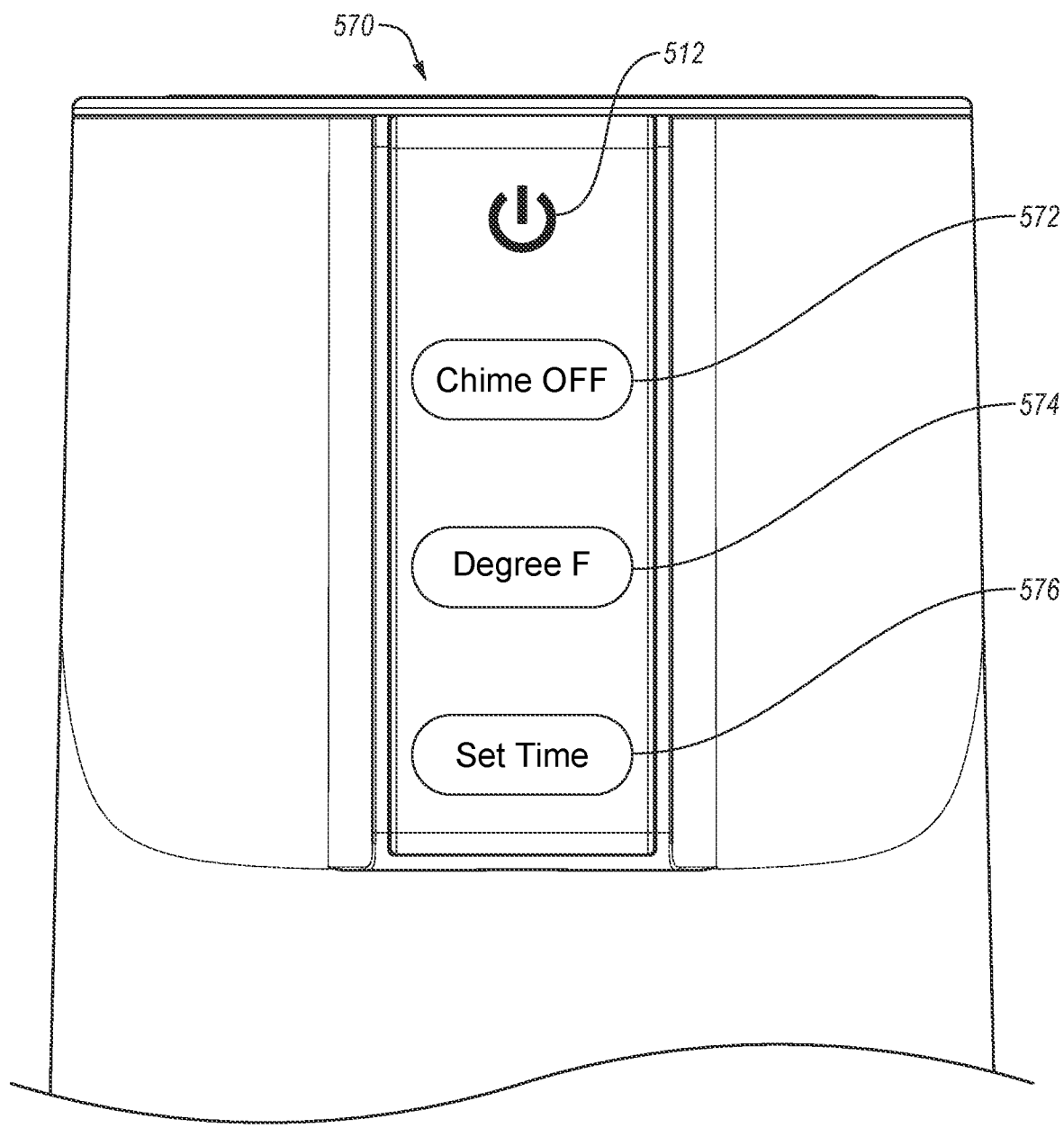

FIG. 5G illustrates a seventh UI 570 of the electronic device. In some embodiments, the seventh UI 570 may provide an interface where the user may make modifications to settings of the associated device. In some embodiments, the seventh UI 570 may include the power icon 512, a notification button 572, a degree button 574, and a time button 576.

In some embodiments, selection of the notification button 572 may change the seventh UI 570 to a UI with one or more options for the user to cycle through. For example, with successive presses of the notification button 572, various notification options may be cycled and displayed on the UI. Notification options may include an audible tone on or off, a light on or off, and/or a vibration on or off. In some embodiments, the notification options may cycle with a short press on the notification button 572. For example, a short press may include pressing and releasing in less than one second. In some embodiments, the notification options may be toggled on and/or off with a long press on the notification button 572. For example, a long press may include pressing and holding for one or more seconds, before releasing the notification button 572.

In some embodiments, selection of the degree button 574 may be configured to alter the display of temperatures on the associated device from Fahrenheit to Celsius or vice versa. In some embodiments, any length press of the degree button 574 may cycle the unit of temperature on the associated device. For example, a short press and/or a long press of the degree button 574 may result in cycling the unit of temperature.

In some embodiments, selection of the time button 576 may be configured to transition the display of the electronic device from the seventh UI 570 to another UI where time may be adjusted, such as the second UI 520.

In the present disclosure, "coupled to" may indicate a direct coupling, such as the electronic device 120 coupled to the housing 104, or an indirect coupling, such as the electronic device 120 coupled to the container 102 via the housing 104, or a combination thereof.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A portable heating device, comprising:
   a container disposed within a housing;
   a lid disposed on an upper portion of the housing and arranged to cover and seal an interior portion of the container;
   a heating element in thermal contact with the container;
   an electronic device coupled to the housing, the electronic device configured to receive input comprising a target temperature to heat breast milk to, the breast milk poured directly in the container or poured in a bag and placed in the container;
   a temperature sensor in thermal contact with the container;
   an electronics insulation layer arranged to thermally protect the electronic device and a controller from the heating element;
   an internal rechargeable battery having a capacity of at least 2000 mAh, a continuous discharge rating of at least 2A, and a voltage of at least 7.2V, the rechargeable battery operably connected to the heating element, the electronic device, the temperature sensor, and the controller;
   a charging port connected to the rechargeable battery;

the controller operably connected to the heating element, the electronic device, and the temperature sensor and configured to:
  determine a current temperature of the breast milk based on a temperature signal from the temperature sensor; and
  cause the heating element to heat the breast milk to the target temperature in response to the current temperature being less than the target temperature.

2. The portable heating device of claim 1, further comprising a rechargeable battery controller operably connected to the rechargeable battery and configured to regulate the power source.

3. The portable heating device of claim 1, wherein the charging port is further configured to:
  receive energy to supply the rechargeable battery in a first configuration;
  receive energy to recharge the rechargeable battery in a second configuration; and
  receive energy to supply the rechargeable battery and recharge the rechargeable battery in a third configuration.

4. The portable heating device of claim 1, further comprising at least two rechargeable batteries.

5. The portable heating device of claim 1, wherein the target temperature is selectable in increments of 1-degree Fahrenheit.

6. A portable heating device, comprising:
  a container internally and centrally disposed within a housing;
  one or more heating elements in thermal contact with the container;
  an electronic device disposed on an exterior portion of the housing, the electronic device configured to receive a user input selecting a target temperature to heat breast milk to, the breast milk poured directly in the container or poured in a bag and placed in the container, and to display the target temperature;
  one or more temperature sensors disposed in thermal contact with the container;
  a controller operably connected to the one or more heating elements, the electronic device, and the one or more temperature sensors, wherein in response to determining that a current temperature of the breast milk measured by the one or more temperature sensors is less than the target temperature, causing the one or more heating elements to heat the breast milk to the target temperature;
  a rechargeable battery having a capacity of at least 2000 mAh, a continuous discharge rating of at least 2A, and a voltage of at least 7.2V, the rechargeable battery disposed within a lower end of the housing, and the rechargeable battery configured to provide power to at least the one or more heating elements, the electronic device, the one or more temperature sensors, and the controller;
  a charging port connected to the rechargeable battery; and
  a rechargeable battery controller operably connected to the rechargeable battery and configured to regulate the rechargeable battery.

7. The portable heating device of claim 6, further comprising the housing having an upper end and the lower end, the upper end comprising inner threads and a spout that extends outwards.

8. The portable heating device of claim 7, further comprising a lid configured to threadably attach to the upper end of the housing, the lid including outer threads that are complementary to the inner threads of the upper end and a lid cavity.

9. The portable heating device of claim 6, further comprising at least two rechargeable batteries.

10. The portable heating device of claim 6, wherein the controller is further configured to provide one or more notifications that the breast milk has reached the target temperature.

11. The portable heating device of claim 10, wherein at least one notification of the one or more notifications includes a wireless communication.

12. The portable heating device of claim 6, wherein the electronic device comprises a display and a touchscreen.

13. A method to portably heat breast milk, the method comprising:
  pouring breast milk directly in a container or pouring breast milk in a bag and placing the bag in the container, the container in thermal contact with a heating element and a temperature sensor;
  receiving user input to power on a rechargeable battery having a capacity of at least 2000 mAh, a continuous discharge rating of at least 2A, and a voltage of at least 7.2V, to select a target temperature, and to begin a heating cycle;
  heating the breast milk within the container by the heating element;
  detecting a current temperature of the breast milk by the temperature sensor; and
  when the current temperature is equal to the target temperature, turning off the heating element and providing a notification that the heating cycle is complete.

14. The method of claim 13, further comprising displaying a current temperature of the breast milk during the heating cycle.

15. The method of claim 13, wherein heating the breast milk comprises conductively transferring heat from the heating element through the container to the breast milk.

16. The method of claim 13, further comprising receiving user input to select a notification option.

17. The method of claim 16, wherein the notification option includes at least one of an audible tone, a vibration, a light indicator, or a wireless communication.

18. The method of claim 13, further comprising recording a cycle time when the heating cycle is complete and displaying the cycle time prior to a subsequent heating cycle.

\* \* \* \* \*